US011890734B2

(12) United States Patent
McCardle et al.

(10) Patent No.: US 11,890,734 B2
(45) Date of Patent: Feb. 6, 2024

(54) LIFT MECHANISM FOR FRAMING NAILER

(71) Applicant: Kyocera Senco Industrial Tools, Inc., Cincinnati, OH (US)

(72) Inventors: Thomas A. McCardle, Cincinnati, OH (US); Christopher D. Klein, Cincinnati, OH (US); Anthony D. Kabbes, Cincinnati, OH (US); Donald C. Ries, Loveland, OH (US); John T. Burke, Williamsburg, OH (US); Kory A. Gunnerson, Cincinnati, OH (US); Jerome J. Schafer, Liberty Township, Butler County, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 0 days.

(21) Appl. No.: 17/957,467

(22) Filed: Sep. 30, 2022

(65) Prior Publication Data

US 2023/0024447 A1 Jan. 26, 2023

Related U.S. Application Data

(63) Continuation of application No. 16/726,488, filed on Dec. 24, 2019, now Pat. No. 11,491,624, which is a (Continued)

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC ........................................................ B25C 1/06
(Continued)

(56) References Cited

U.S. PATENT DOCUMENTS

| | | | |
|---|---|---|---|
| 860,536 | A | 7/1907 | Ellingham |
| 1,774,967 | A | 9/1930 | Ellis |

(Continued)

FOREIGN PATENT DOCUMENTS

| | | |
|---|---|---|
| DE | 1510164 | 3/1970 |
| DE | 8711784 | 8/1987 |

OTHER PUBLICATIONS

Two-page "Tool Assembly" drawing of Senco Model No. SN952XP pneumatic tool; dated Mar. 4, 2008; representative of earlier tools in public use before 2006; Admitted Prior Art.

(Continued)

*Primary Examiner* — Thanh K Truong
*Assistant Examiner* — Patrick B Fry
(74) *Attorney, Agent, or Firm* — Frederick H. Gribbell; Russell F. Gribbell

(57) ABSTRACT

A fastener driving tool that includes a lift mechanism for moving the driver from a driven position to a ready position. In one embodiment, the lift mechanism is mounted to a movable pivot arm, and the pivot arm is slightly rotated to allow the driver to drive a fastener; when the driver is to be lifted in a return stroke, the lifter subassembly is moved back into engagement with the driver, and multiple lifter pins contact protrusions in the driver to lift the driver from the driven position to the ready position. In another embodiment, the pivotable lifter floats along the driver, and "releases" from contact only to prevent a jam or otherwise undesirable operating condition involving the driver; otherwise, the lifter remains nested in the tool's guide body during all operating states. A solenoid-operated latch also is provided to prevent the driver from moving downward (for driving a fastener).

14 Claims, 16 Drawing Sheets

Related U.S. Application Data continuation of application No. 15/082,584, filed on Mar. 28, 2016, now Pat. No. 10,549,412.

(60) Provisional application No. 62/140,177, filed on Mar. 30, 2015.

(58) Field of Classification Search
USPC .................................................. 227/107, 146
See application file for complete search history.

(56) References Cited

U.S. PATENT DOCUMENTS

| | | | | |
|---|---|---|---|---|
| 2,575,455 | A | 11/1951 | Lang | |
| 2,814,041 | A | 11/1957 | Haley | |
| 2,933,290 | A | 4/1960 | Ryder | |
| 3,150,488 | A | 9/1964 | Haley | |
| 3,589,588 | A | 6/1971 | Vasku | |
| 3,847,322 | A | 11/1974 | Smith | |
| 3,878,902 | A | 4/1975 | Matsuo | |
| 4,203,353 | A | 5/1980 | Bernham | |
| 4,215,808 | A | 8/1980 | Sollberger | |
| 4,530,455 | A | 7/1985 | Vomberger | |
| 4,741,518 | A | 5/1988 | Wallis | |
| 5,199,627 | A | 4/1993 | Christensen | |
| 5,503,319 | A | 4/1996 | Lai | |
| 5,557,905 | A | 11/1996 | Cook | |
| 5,605,268 | A | 2/1997 | Hayashi | |
| 5,720,423 | A | 2/1998 | Kondo | |
| 6,023,989 | A | 2/2000 | Imase | |
| 6,533,156 | B1 | 3/2003 | Chang | |
| 6,938,811 | B2 | 9/2005 | Ehmig | |
| 6,997,367 | B2 | 2/2006 | Hu | |
| 7,040,521 | B2 | 5/2006 | Kolodziej | |
| 7,225,961 | B1 | 6/2007 | Lee | |
| 7,225,962 | B2 | 6/2007 | Porth | |
| 7,494,036 | B2 | 2/2009 | Shima | |
| 8,011,547 | B2 * | 9/2011 | Leimbach | B25C 1/06 227/129 |
| 8,267,297 | B2 | 9/2012 | Leimbach | |
| 8,763,874 | B2 * | 7/2014 | McCardle | B25C 1/06 227/129 |
| 2003/0218042 | A1 | 11/2003 | Odoni | |
| 2005/0082334 | A1 | 4/2005 | Hu | |
| 2005/0217875 | A1 | 10/2005 | Forster | |
| 2006/0180631 | A1 | 8/2006 | Pedicini | |
| 2007/0007319 | A1 | 1/2007 | Simonelli | |
| 2007/0045377 | A1 | 3/2007 | Towfighi | |
| 2008/0041914 | A1 | 2/2008 | Simonelli | |
| 2008/0067213 | A1 | 3/2008 | Shima | |
| 2008/0190986 | A1 * | 8/2008 | Chang | B25C 1/06 227/107 |
| 2008/0190988 | A1 | 8/2008 | Pedicini | |
| 2018/0036870 | A1 | 2/2018 | Komazaki | |

OTHER PUBLICATIONS

One-page magnified view of "Tool Assembly" drawing of Senco Model No. SN952XP pneumatic tool; Mar. 4, 2008; representative of earlier tools in public use before 2006; Admitted Prior Art.

ISA International Search Report (dated Aug. 22, 2016).

* cited by examiner

LIFT MECHANISM FOR FRAMING NAILER

CROSS-REFERENCE TO RELATED APPLICATIONS

The present application claims priority to provisional patent application Ser. No. 62/140,177, titled "LIFT MECHANISM FOR FRAMING NAILER," filed on Mar. 30, 2015; the present application is a continuation of U.S. patent application Ser. No. 15/082,584, titled "LIFT MECHANISM FOR FRAMING NAILER," filed on Mar. 28, 2016; and the present application is a continuation of U.S. patent application Ser. No. 16/726,488, titled "LIFT MECHANISM FOR FRAMING NAILER," filed on Dec. 24, 2019.

TECHNICAL FIELD

The technology disclosed herein relates generally to linear fastener driving tools and, more particularly, is directed to portable tools that drive staples, nails, or other linearly driven fasteners. At least one embodiment is disclosed as a linear fastener driving tool, in which a cylinder filled with compressed gas is used to quickly force a piston through a driving stroke movement, while also driving a fastener into a workpiece. The piston is then moved back to its starting position during a return stroke by use of a rotary-to-linear lift mechanism, thereby preparing the tool for another driving stroke. An elongated driver member is attached to the piston, and has a plurality of spaced-apart protrusions along its longitudinal edges that are used to contact the lift mechanism, which lifts the driver during the return stroke.

The lift mechanism is pivotable, and is controlled to move into either an interfering position or a non-interfering position with respect to the driver protrusions, and in a "safety mode" also acts as a partial safety device by preventing the driver from making a full driving stroke at an improper time. The lift mechanism includes a "pivot arm" that has two ends; the first end is attached to the nailer tool's guide body near the area where the driver member is located, and the first end includes a bearing mounted to a shaft that acts as a pivot point for the entire pivot arm. The second end of the pivot arm includes a lifter bearing to which a rotatable lifter gear is attached; the outer region of the rotatable lifter gear has multiple lifter pins that protrude from the gear at right angles, and which are used to engage the protrusions of the driver member. When so engaged (during a first mode of operation), the lifter pins of the rotatable lifter gear will force the driver member to undergo a return stroke.

If the lift mechanism is moved to its non-engagement position, the second end of the pivot arm is rotated such that the lifter pins are moved away from the driver member, and in that (second) mode of operation, the lifter pins will not interfere with the linear movement of the driver member. In this second mode, the driver member is allowed to be forced by the pressurized piston to drive a fastener from the exit end (the bottom) of the nailer tool, which is typically referred to as the driving stroke.

In an alternative embodiment, the driver member has raised areas along its generally planar surface. The driver member, as noted above, has several spaced-apart protrusions that extend away from its centerline, and in general, the entire driver member is of a uniform thickness, including along its entire longitudinal length and also including the multiple protrusions that are generally at right angles to its longitudinal axis. However, at one or more of the right angle protrusions, there is a small raised area that is designed to make contact with one of the lifter pins of the lift mechanism. Under normal circumstances, the open areas between the multiple protrusions of the driver member are the locations where the lifter pins are supposed to move toward and, as the gear at the second end of the pivot arm rotates, the lifter pins should bump against the bottom edge (assuming the tool is pointed downward) of one of the driver member protrusions. That contact forces the driver member upward as the lifter pins continue to rotate through a return stroke.

At times, however, the driver member may not be correctly positioned, and the lifter pin might bump against the flat surface of the protrusion of the driver member, instead of bumping against the protrusion's bottom edge (as designed). The small raised area of this alternative embodiment suddenly becomes important in that situation; the lifter pin will catch on the lip of that raised area, and will tend to force the driver member to move a small distance. When that occurs, the "next" lifter pin (as the gear at the second end of the pivot arm continues to rotate) will then likely find an open area (i.e., between the driver member protrusions) to fit into, and thereby will be able to engage the bottom edge of one of the protrusions and begin a normal lifting cycle to cause a return stroke.

In another alternative embodiment, the lifter pins have cylindrical rollers that can rotate about the arcuate surface of the solid lifter pins. These rollers make the overall structure of the lifter pins somewhat more "slippery," with respect to making contact with the driver member. This can be important in situations where the driver member is incorrectly positioned at the end of a driving stroke, because if the driver member protrusions end up in a "bad" position, the lifter pins could possibly jam against the driver member. If a jam occurs, then the tool must be deactivated and disassembled so as to un-jam the lifter pins from the driver member. However, in this embodiment the rollers are free to rotate about the outer surface of the otherwise solid lifter pins, and in a situation where the driver member is incorrectly positioned, the rollers will allow the lift mechanism to slip along the surface of the driver member without jamming. At the same time, that action will likely tend to move the driver member upward a small distance, and then the "next" lifter pin will be able to contact the bottom edge of one of the driver member protrusions, forcing the driver upward for a return stroke, and thereby avoiding a jam condition from occurring.

The lift mechanism is powered by an electric motor that rotates a gear train, which causes a lifter gear at the second end of the pivot arm to rotate. Using a first clearing mechanism embodiment, after the return stroke has occurred (i.e., after the driver member has been "lifted" back to its starting (or "drive") position), the direction of the lifter subassembly is reversed for a moment. When that occurs, a cam profile of a rotatable "kicker" grows effectively larger in outer diameter, which locks up against a surface of the outer circumference of a smooth surface of a lifter wheel (part of the lifter subassembly) at the second end of the pivot arm, which locks up the lifter shaft (at the lifter wheel). The lifter subassembly will stay in this position until the gear train causes a reverse rotation of a small diameter gear to occur. When the small diameter gear reverses direction with the lifter shaft locked, the pivot arm will be pivoted away from the driver member. This action disengages the lifter pins from the protrusions of the driver member, which in turn, clears the driver member from its engagement with the lifter subassembly, thereby freely allowing the pressurized piston to force the driver member downward (assuming the nailer tool is pointing down), and thereby driving a fastener from the bottom of the tool.

The driving mechanism used in the fastener driving tool disclosed herein includes a pivotable latch that is normally pressed against the driver member. A "release solenoid" is controlled by an electronic controller, and when it is time to "drive" a fastener, the release solenoid is energized to move the latch to a second position, where the latch releases from contact with the driver member. This allows the driver member to be quickly pushed by its connecting piston, to drive a fastener that is positioned in the driver track. After the fastener driving stroke is complete, the solenoid de-energizes, and the pivotable latch moves back to its first position where it again contacts the driver member. The physical shape and orientation of the latch allows the driver member to move upward (i.e., from its driven position to its ready position), so that it is ready for another driving stroke.

In yet another alternative embodiment, a fastener driving tool disclosed herein includes an elongated driver member attached to the piston, and has a plurality of spaced-apart protrusions along its longitudinal edges that are used to contact a lift mechanism, which lifts the driver during the return stroke. The lift mechanism is pivotable, and is able to float along side the driver member during normal operation; however, the lift mechanism can rotate into a non-interfering position with respect to the driver protrusions, and thereby "release" from making contact with the driver member, when necessary. This release ability allows the lift mechanism to prevent jams in most situations.

For this other alternative embodiment, the lift mechanism includes a "pivot arm" that has two ends; the first end is attached to the nailer tool's guide body near the area where the driver member is located, and the first end includes a bearing mounted to a shaft that acts as a pivot point for the entire pivot arm. The second end of the pivot arm includes a pair of lifter bearings and a pair of rotatable lifter gears. The outer region of the rotatable lifter gear has multiple lifter pins that protrude from each of the lifter gears at right angles, and which are used to engage the protrusions of the driver member. When so engaged (during a first mode of operation), the lifter pins of the rotatable lifter gears will force the driver member to undergo a return stroke.

In this alternative embodiment, the driver member again has raised areas along its generally planar surface. The driver member has several spaced-apart protrusions that extend away from its centerline, and in general, the entire driver member is of a uniform thickness, including along its entire longitudinal length and also including the multiple protrusions that are generally at right angles to its longitudinal axis. However, at one or more of the right angle protrusions, there is a small raised area that is designed to make contact with one of the lifter pins of the lift mechanism. Under normal circumstances, the open areas between the multiple protrusions of the driver member are the locations where the lifter pins are supposed to move toward and, as the lifter gears at the second end of the pivot arm rotate, the lifter pins should bump against the bottom edge (assuming the tool is pointed downward) of one of the driver member protrusions. That contact forces the driver member upward as the lifter pins continue to rotate through a return stroke.

At times, however, the driver member may not be correctly positioned, and the lifter pin might bump against the flat surface of the protrusion of the driver member, instead of bumping against the protrusion's bottom edge (as designed). The small raised area of this alternative embodiment suddenly becomes important in that situation; the lifter pin will catch on the lip of that raised area, and will tend to force the driver member to move a small distance. When that occurs, the "next" lifter pin (as the gear at the second end of the pivot arm continues to rotate) will then likely find an open area (i.e., between the driver member protrusions) to fit into, and thereby will be able to engage the bottom edge of one of the protrusions and begin a normal lifting cycle to cause a return stroke.

In this alternative embodiment, the lifter pins again have cylindrical rollers that can rotate about the arcuate surface of the solid lifter pins. These rollers make the overall structure of the lifter pins somewhat more slippery, with respect to making contact with the driver member. This can be important in situations where the driver member is incorrectly positioned at the end of a driving stroke, because if the driver member protrusions end up in a "bad" position, the lifter pins could possibly jam against the driver member. If a jam occurs, then the tool must be deactivated and disassembled so as to un-jam the lifter pins from the driver member. However, in this embodiment the rollers are free to rotate about the outer surface of the otherwise solid lifter pins, and in a situation where the driver member is incorrectly positioned, the rollers will allow the lift mechanism to slip along the surface of the driver member without jamming. At the same time, that action will likely tend to move the driver member upward a small distance, and then the "next" lifter pin will be able to contact the bottom edge of one of the driver member protrusions, forcing the driver upward for a return stroke, and thereby avoiding a jam condition from occurring.

STATEMENT REGARDING FEDERALLY SPONSORED RESEARCH OR DEVELOPMENT

None.

BACKGROUND

An early air spring fastener driving tool is disclosed in U.S. Pat. No. 4,215,808, to Sollberger. The Sollberger patent used a rack and pinion-type gear to "jack" the piston back to its driving position. A separate motor was to be attached to a belt that was worn by the user; a separate flexible mechanical cable was used to take the motor's mechanical output to the driving tool pinion gear, through a drive train.

Another air spring fastener driving tool is disclosed in U.S. Pat. No. 5,720,423, to Kondo. This Kondo patent used a separate air replenishing supply tank with an air replenishing piston to refresh the pressurized air needed to drive a piston that in turn drove a fastener into an object.

Another air spring fastener driving tool is disclosed in published patent application no. US2006/0180631, by Pedicini, which uses a rack and pinion to move the piston back to its driving position. The rack and the pinion gear are decoupled during the drive stroke, and a sensor is used to detect this decoupling. The Pedicini tool uses a release valve to replenish the air that is lost between nail drives.

Senco Brands, Inc. sells a product line of automatic power tools referred to as nailers, including tools that combine the power and the utility of a pneumatic tool with the convenience of a cordless tool. One primary feature of such tools is that they use pressurized air to drive a piston that drives the nail. In some Senco tools, that pressurized air is re-used, over and over, so there is no need for any compressed air hose, or for a combustion chamber that would require fuel.

Although Senco "air tools" are quite reliable and typically can endure thousands of driving cycles without any significant maintenance, they do have wear characteristics for certain components. For example, the piston stop (or "bumper") at the bottom of the drive cylinder can become compressed after thousands of driving cycles, for example. The more cycles that a tool is used without any significant maintenance, the more compressed the bumper can become, and this compression exhibits a certain mechanical hysteresis which eventually causes the piston to halt at a lower position than it did when the tool was new. Consequently, the driver member (or "driver") will also stop at a lower position along its longitudinal axis than when the tool was new, and after a time, this can cause variations in operation of the lift mechanism that raises the piston back to its starting position.

SUMMARY

Accordingly, it is an advantage to provide a fastener driving tool that uses a lift mechanism that is controlled to move into either an interfering position or a non-interfering position with respect to protrusions on the driver member.

It is another advantage to provide a fastener driving tool that includes a driver member that includes protrusions that are engaged by rotating lifter pins of a lifter subassembly, in which the overall lift mechanism includes a pivot arm that holds the lifter subassembly in an engagement position at times when the driver member is to be lifted, but also allows the lifter subassembly to be pivoted away from the driver member to an open position, at times when the driver member needs to move quickly to drive a fastener.

It is yet another advantage to provide a fastener driving tool that includes a driver member that has raised areas along certain portions of the protrusions of that driver member, such that the rotating lifter pins of a lifter subassembly can briefly engage the raised areas of the driver member, if needed to move the driver member a short distance in situations where the driver member was somewhat misaligned with the lifter subassembly.

It is a further advantage to provide a fastener driving tool having a lift mechanism with a rotatable lifter subassembly including lifter pins that have cylindrical rollers that can rotate about the arcuate surface of the lifter pins, thereby making the overall structure of the lifter pins somewhat more slippery with respect to making contact with the driver member protrusions, which can possibly prevent a jam from occurring.

It is still another advantage to provide a fastener driving tool that uses a lift mechanism powered by an electric motor, in which the rotation of the lifter subassembly is briefly reversed for a moment which allows a rotatable kicker wheel with a cam profile to grow effectively larger in outer diameter to lock up against the surface of a smooth lobe of a lifter wheel, thereby causing a pivot arm of a lifter subassembly to be moved away from the driver member, thereby disengaging the lifter pins from protrusions of the driver member to allow a quick (full power) driving stroke.

It is a yet further advantage to provide a fastener driving tool that includes a latch that engages along the surface of a driver member that is used to drive a fastener, in which the latch will prevent the driving stroke from occurring unless a solenoid is energized to rotate the latch a small distance, thus releasing the latch from its engagement surface against the driver member, and thereby allowing the driver member to drive a fastener.

It is yet another advantage to provide a fastener driving tool that includes a driver member having protrusions that are engageable by rotating lifter pins of a lifter subassembly, in which the overall lift mechanism includes a pivot arm that, when located in a first position, holds the lifter subassembly in an engagement position at times when the driver member is to be lifted during normal operating conditions, but also has a degree of freedom such that the pivot arm is movable toward a second position such that, during abnormal operating conditions, the pivot arm is able to automatically release from its first position and allow the lifter subassembly to displace toward the second position, thereby preventing the lifter subassembly and the driver member from jamming.

It is still another advantage, in more general terms, provide a fastener driving tool that includes an elongated driver member having a first contacting surface that are engageable by a second contacting surface of a lifter subassembly, in which the overall lift mechanism includes a movable arm that, when located in a first position, holds the lifter subassembly in an engagement position at times when the driver member is to be lifted during normal operating conditions, but also has a degree of freedom such that the movable arm is movable toward a second position so that, during abnormal operating conditions, the movable arm is able to automatically release from its first position and allow the lifter subassembly to displace toward the second position, thereby preventing the lifter subassembly and the driver member from jamming.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a driving mechanism for use in a fastener driving tool is provided, which comprises: (a) a guide body that receives a fastener that is to be driven from an exit end of the driving mechanism; (b) a movable driver actuation device; (c) an elongated driver member that is in mechanical communication with the movable driver actuation device at a first end of the driver member, the driver member having a second, opposite end that is sized and shaped to push a fastener from the exit end of the driving mechanism, the driver member having a direction of movement between a first end travel location and a second end travel location, the driver member having a first contacting surface between the first end and the second end, the driver member having a ready position proximal to one of the first and second end travel locations; and (d) a lift mechanism which includes a movable arm that exhibits a proximal end and a distal end, the proximal end being in communication with the guide body and the distal end having a lifter subassembly mounted thereto, the lifter subassembly including a second contacting surface, the movable arm being movable between a first position and a second position, the movable arm being biased toward the first position, the movable arm having a mechanical freedom of movement toward the second position, and if the movable arm is in the first position, the second contacting surface of the lifter subassembly is in an engagement position with respect to the first contacting surface of the driver member; (e) characterized in that: (i) during a lifting stroke, the second contacting surface of the lifter subassembly attempts to contact the first contacting surface of the driver member and thus cause the driver member to move to a ready position; (ii) however, during the lifting stroke, if the driver member and the lifter subassembly are misaligned, such that the first contact surface cannot be properly contacted by the second contact surface, then the movable arm automatically releases from the first position and allows the lifter subassembly to displace toward the second position, which allows the second contacting surface to slide against the misaligned first contacting surface without jamming.

In accordance with another aspect, a driving mechanism for use in a fastener driving tool is provided, which comprises: (a) a guide body that receives a fastener that is to be driven from an exit end of the driving mechanism; (b) a movable driver actuation device; (c) an elongated driver member that is in mechanical communication with the movable driver actuation device at a first end of the driver member, the driver member having a second, opposite end that is sized and shaped to push a fastener from the exit end of the driving mechanism, the driver member having a direction of movement between a driven position and a ready position, the driver member having a first contacting surface between the first end and the second end; (d) a lift mechanism which includes a movable arm that exhibits a proximal end and a distal end, the proximal end being in communication with the guide body and the distal end having a lifter subassembly mounted thereto, the lifter subassembly including a second contacting surface, the movable arm being movable between a first position and a second position, the movable arm being biased toward the first position, the movable arm having a mechanical freedom of movement toward the second position, and if the movable arm is in the first position, the second contacting surface of the lifter subassembly is in an engagement position with respect to the first contacting surface of the driver member; (e) wherein, during normal operating conditions: (i) while the movable arm is in the first position, the second contacting surface of the lifter subassembly properly contacts the first contacting surface of the driver member and causes the driver member to move from the driven position to the ready position; (ii) while the movable arm is in the first position, after moving the driver member to the ready position, the lifter subassembly holds the driver member at the ready position until a user actuates a trigger mechanism; and (iii) while the movable arm is in the first position, if the trigger mechanism is actuated, the lifter subassembly causes the second contact surface to release from contact with the first contact surface of the driver member, thereby allowing the movable driver actuation device to force the driver member to undergo a driving stroke from the ready position to the driven position; and (f) wherein, during abnormal operating conditions: (i) while the movable arm is in the first position, the second contacting surface of the lifter subassembly moves and attempts to contact the first contact surface of the driver member; (ii) however, if the driver member is positioned such that the first contact surface cannot be properly contacted by the second contact surface, then the movable arm automatically releases from the first position and allows the lifter subassembly to displace toward the second position.

In accordance with yet another aspect, a driving mechanism for use in a fastener driving tool is provided, which comprises: (a) a guide body that receives a fastener that is to be driven from an exit end of the driving mechanism; (b) a movable driver actuation device; (c) an elongated driver member that is in mechanical communication with the movable driver actuation device at a first end of the driver member, the driver member having a second, opposite end that is sized and shaped to push a fastener from the exit end of the driving mechanism, the driver member having a direction of movement between a driven position and a ready position, the driver member having at least one longitudinal edge, the driver member having a plurality of spaced-apart protrusions along the at least one longitudinal edge; (d) a lift mechanism which includes a movable arm that exhibits a proximal end and a distal end, the proximal end being movably in communication with the guide body, and the distal end having a lifter subassembly mounted thereto, the movable arm being movable between a first position and a second position, the lifter subassembly including at least one rotatable disk that has a plurality of lifter pins extending from a surface of the rotatable disk, the movable arm being biased toward the first position, however, the movable arm having a mechanical freedom of movement toward the second position, and if the movable arm is in the first position, the lifter subassembly is in an engagement position with respect to at least one of the plurality of spaced-apart protrusions of the driver member; (e) wherein, in normal operating conditions: (i) while the movable arm is in the first position, the lifter subassembly rotates in a first direction and a rotational movement of the lifter pins properly contacts the at least one of the plurality of spaced-apart protrusions of the driver member for moving the driver member from the driven position to the ready position; (ii) while the movable arm is in the first position, after moving the driver member to the ready position, the lifter subassembly stops rotating and at least one of the lifter pins holds the driver member at the ready position until a user actuates a trigger mechanism; (iii) while the movable arm is in the first position, if the trigger mechanism is actuated, the lifter subassembly again rotates in the first direction such that the at least one of the lifter pins releases from contact with the driver member, thereby allowing the driver member to undergo a driving stroke from the ready position to the driven position; and (f) wherein, in abnormal operating conditions: (i) while the movable arm is in the first position, the lifter subassembly rotates in the first direction, and a rotational movement of the lifter pins attempts to contact the at least one of the plurality of spaced-apart protrusions of the driver member; (ii) however, if the driver member is positioned such that the plurality of spaced-apart protrusions cannot be properly contacted by the lifter pins, then the movable arm automatically releases from the first position and allows the lifter subassembly to displace toward the second position.

In accordance with a further aspect, a driving mechanism for use in a fastener driving tool is provided, which comprises: (a) a guide body that receives a fastener that is to be driven from an exit end of the driving mechanism; (b) a movable driver actuation device; (c) an elongated driver member that is in mechanical communication with the movable driver actuation device at a first end of the driver member, the driver member having a second, opposite end that is sized and shaped to push a fastener from the exit end of the driving mechanism, the driver member having a direction of movement between a driven position and a ready position, the driver member having at least one longitudinal edge, the driver member having a plurality of spaced-apart protrusions along the at least one longitudinal edge; (d) a lift mechanism which includes a movable arm that exhibits a proximal end and a distal end, the proximal end being movably in communication with the guide body, and the distal end having a lifter subassembly mounted thereto, the movable arm being movable between a first position and a second position, the lifter subassembly including at least one rotatable disk that has a plurality of lifter pins extending from a surface of the rotatable disk; and (e) a kicker mechanism that forces the movable arm to be moved from the first position toward the second position, such that the driver member is allowed to quickly move from the ready position to the driven position and thereby drive a fastener from the exit end of the driving mechanism; wherein: (i) if the movable arm is in the first position, the lifter subassembly is mechanically engaged with at least one of the plurality of spaced-apart protrusions of the driver member; (ii) if the movable arm is in the second position, the lifter subassembly is mechanically clear from the at least one of the plurality of spaced-apart protrusions of the driver member; (iii) while the movable arm is in the first position, for moving the driver member from the driven position to the ready position, the lifter subassembly rotates in a first direction so that a rotational movement of the lifter pins will contact the at least one of the plurality of spaced-apart protrusions of the driver member; (iv) the movable arm is biased toward the first position; (v) however, to provide a robust system that allows for misalignment between the lifter pins and the plurality of spaced-apart protrusions of the driver member, the movable arm has mechanical freedom of movement toward the second position that allows the lifter pins to slide against a misaligned one of the plurality of spaced-apart protrusions without jamming.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
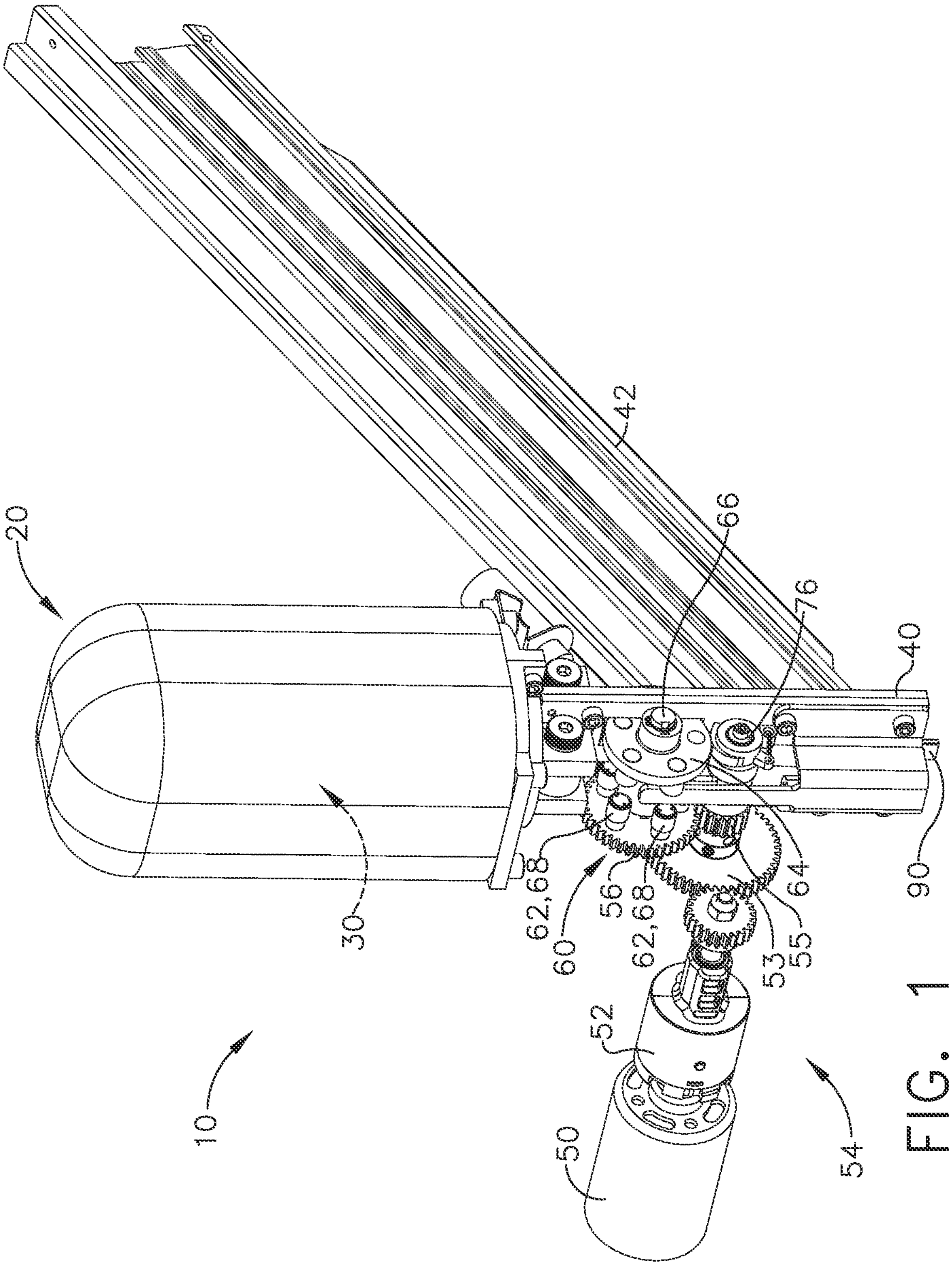
FIG. 1 is a perspective view from above and to one side of a first embodiment driver assembly for a framing nailer tool, as constructed according to the principles of the technology disclosed herein.

Reference will now be made in detail to at least one present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

Referring now to FIG. 1, a framing nailer tool is illustrated, generally designated by the reference numeral 10. Nailer tool 10 includes a pressure chamber 20 that includes a cylinder 30 with a movable driver actuation device, which is a piston 32 in this illustrated embodiment. The movable piston 32 is connected to a driver member 90 that, when actuated, drives a fastener from a magazine 42. The tool 10 includes a guide body 40, an electric motor 50, a gearbox 52 that receives the output shaft from the electric motor, and several gear train gears 54 that receive the output from the gearbox 52. The gear train gears 54 include a first (larger) gear 53, a second (smaller) gear 55, and a third (final) gear 56. The second gear is also referred to herein as a "small diameter gear" 55, and the third gear is also referred to herein as a "lifter gear" 56; lifter gear 56 is part of a lifter subassembly 60. Note that the first gear 53 and second gear 55 are keyed to the same shaft (i.e., pivot shaft 76), so these first and second gears 53 and 55 always rotate together.

Lifter subassembly 60 includes a lifter shaft 66 that extends from the left side (in the view of FIG. 1) to the right side (in this view), and the lifter shaft 66 which is mechanically connected to the lifter gear 56 and to a lifter wheel 64. In the view of FIG. 1, the left side of the lifter subassembly is sometimes referred to as "side A" while the right side in this view is sometimes referred to as "side B," with regard to terminology for the lifter subassembly. The lifter gear 56 is, therefore, on side A of the subassembly 60, while the lifter wheel 64 is on side B of that subassembly. Both the lifter wheel and the lifter gear rotate together, via the lifter bearing(s) 58 and lifter shaft 66.

The electric motor 50 is commanded to rotate by an electronic controller (not shown) when it is desired to lift the combination piston 32 and driver member 90 from their "driven position" to their initial drive or "ready position." As will be explained below, when the lifter gear 56 rotates, via action of the electric motor 50, there are mechanical components that force the driver member 90 upward (in the view of FIG. 1), so that the piston is moved further into the pressure chamber 20, which is where the piston will remain at the "ready position," until it drives the next fastener.

Both the lifter gear 56 and the lifter wheel 64 have "pins" 62 that protrude from the lifter gear and the lifter shaft at approximately right angles to the circular plane of the wheel 64 or gear 56, respectively. These lifter pins 62 are visible on FIG. 1, and they are illustrated in more detail in some of the other views of these drawings. In other words, the lifter gear and lifter wheel comprise rotatable disks that each have a plurality of lifter pins extending from a surface of those rotatable disks, and it is the action of these lifter pins 62 that engages the driver member 90 to force it upward, from its driven position to its ready position.

Figure 2:
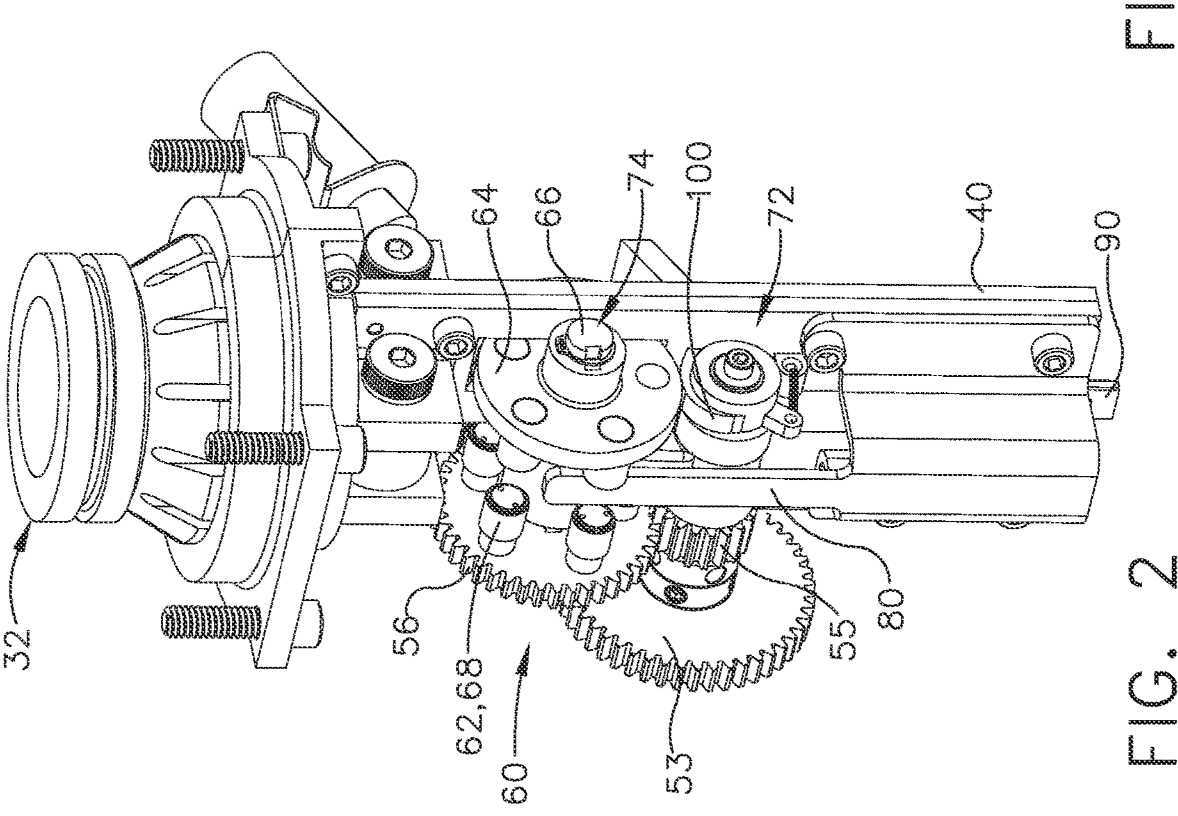
FIG. 2 is a perspective view from above and to the side of the driver assembly for the tool depicted in FIG. 1, showing a lifter subassembly in the engagement position.
Figure 3:
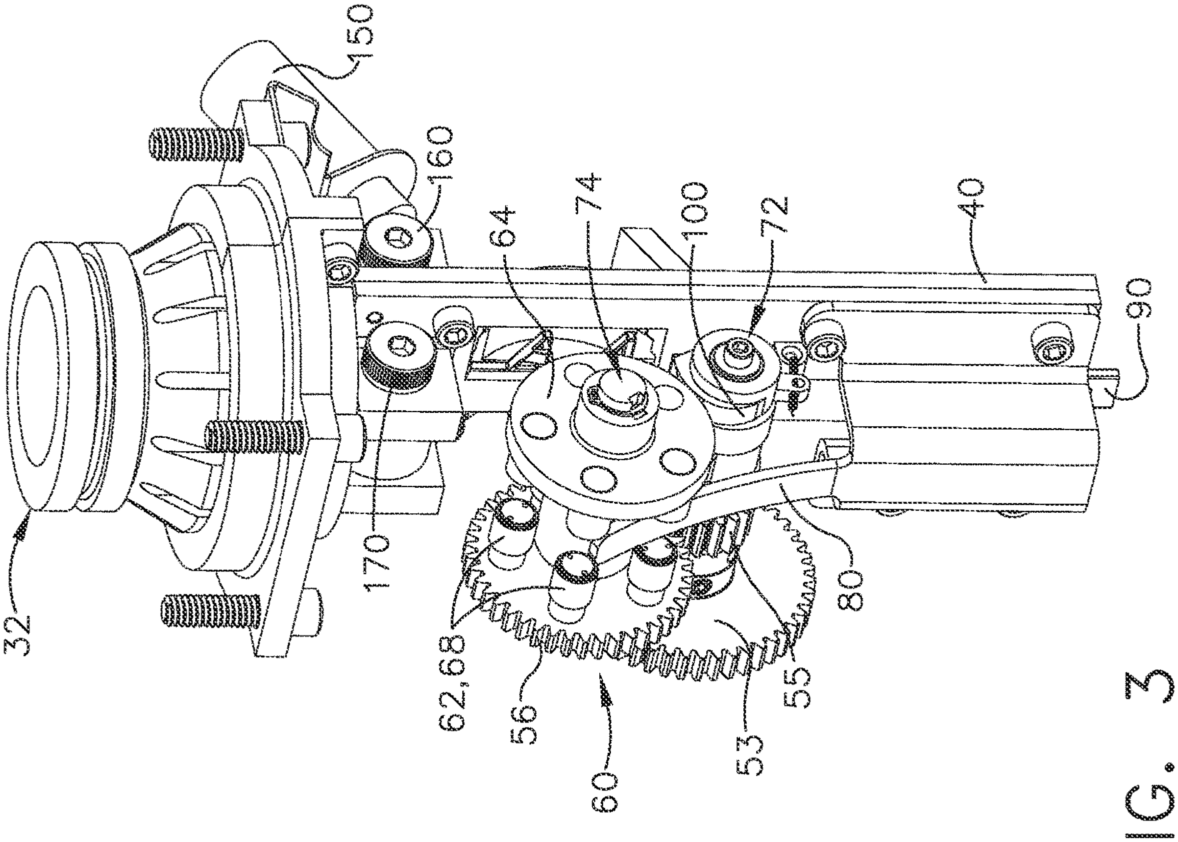
FIG. 3 is a perspective view from above and to the side of the driver assembly for the tool depicted in FIG. 1, showing a lifter subassembly in the open, non-engagement position.

Referring now to FIGS. 2 and 3, these two views show the drive assembly without the pressure chamber and cylinder, and without the electric motor and certain other portions of the gear train. FIG. 2 illustrates the drive assembly with the lifter subassembly in its "engagement position," while FIG. 3 shows the same equipment with the lifter subassembly in its "open position." In FIG. 3, the opening has been exaggerated for clarity. In these views, the piston 32 is illustrated at the top of the assembly, showing the piston in its driven position, which means that it is at the bottom of its travel for this tool. The lifter pins are illustrated at 62, and there are five of them on each side of the lifter subassembly 60. In other words, there are five lifter pins 62 protruding at right angles from the lifter gear 56, and there are five more lifter pins 62 protruding at right angles from the lifter wheel 64. In this manner, both sides of the driver member 90 are equally engaged by the lift mechanism.

Figure 7:
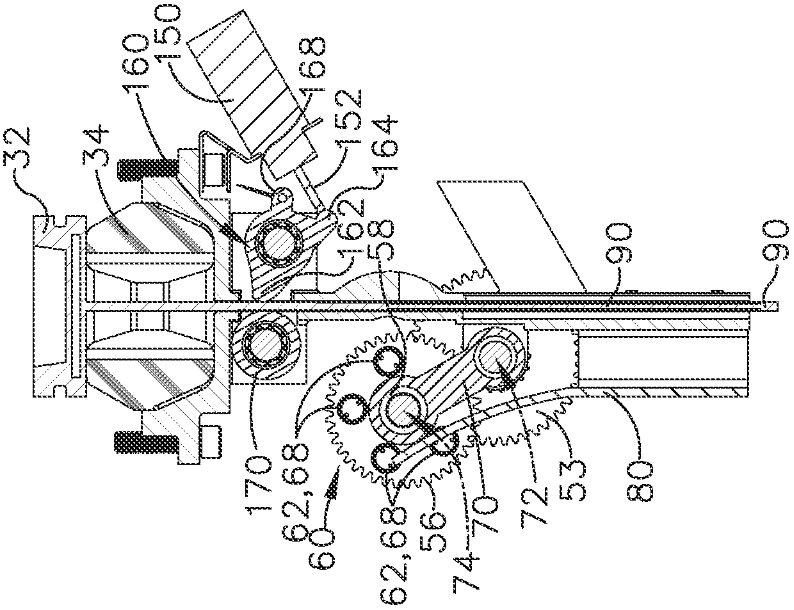
FIG. 7 is a side cross-sectional view of the tool of FIG. 6, taken along the line 7-7.

One important feature of this construction is a pivot arm 70, which cannot be easily seen on FIGS. 2 and 3, but can be seen on many other views, especially in the cross-section view of FIG. 7. The pivot arm has a first end at 72, which acts as a pivot axis. The second end of the pivot arm is at 74, which is the longitudinal axis for the rotatable lifter shaft 66. The second end is the distal end, while the first end is the proximal end, with respect to the guide body 40. As can be seen when comparing FIG. 2 from FIG. 3, the lifter subassembly 60 can be swung away from the guide body 40 to become disengaged (as seen in FIG. 3), or the lifter subassembly 60 can remain engaged by staying nested with the guide body 40 (as seen in FIG. 2). These perspective views of FIGS. 2 and 3 do not readily show the mechanical effects of being engaged or disengaged, but the later views show those effects clearly. The pivot arm 70 thus becomes a "movable arm" having displacement that is limited to a maximum travel of between a first position and a second position, inclusive. The first position is when the lifter subassembly 60 is engaged (i.e., nested with the guide body 40), and the second position is when the lifter subassembly has been disengaged such that the movable (pivot) arm 70 has displaced (pivoted) its maximum distance away from its engagement (nested) position.

Figure 5:
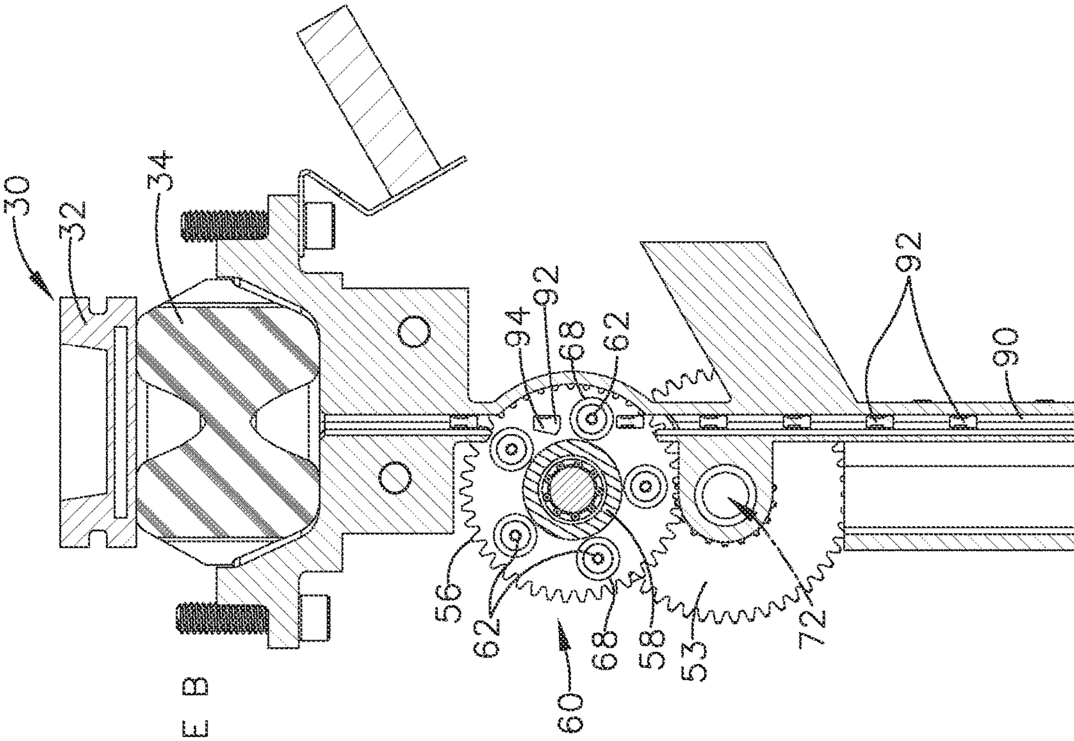
FIG. 5 is a cross-section view taken along the line 5-5 in FIG. 4, showing the tool from its side.

Another important feature of this construction is a device that "kicks" the lifter subassembly 60 away from its engagement position to its open position. That "kicking device" is sometimes referred to herein as a "kicker." In this first embodiment, that kicker is a rotatable cam, generally designated by the reference numeral 100, which exhibits a cam profile 104 that can be better seen on FIG. 10 and also FIG. 13. When the lifter subassembly 60 rotates in a first direction, which is the direction required for lifting the driver member 90 from its driven position to its ready position (i.e., for making a return stroke), the gear train 54 also tends to rotate the rotatable kicker 100 in a clockwise direction as viewed on FIG. 8. The circumferential surface of lifter wheel 64 will slide against the surface of the kicker cam 100 in this operational mode, and the lifter subassembly 60 will stay within its engagement position, as viewed in FIG. 10. Therefore, when the lifter gear 56 is rotated in that first direction, the lifter pins 62 will engage with spaced-apart protrusions 92 of the driver member 90, thereby forcing the driver 90 to be lifted upward (in these views), from the driven position to the ready position. FIG. 5 shows an example of how the lifter pins 62 can fit within spaces between the protrusions 92 of the driver member 90. In very general terminology, the protrusions 92 represent a "first contacting surface," while the lifter pins 62 represent a "second contacting surface."

The driver member 90 must be at its "ready position" before driving a fastener, and the lifter pins 62 are the mechanical devices that previously would have moved the driver member to that ready position. In most circumstances, the lifter pins 62 will remain in contact with the driver member's protrusions 92 before the driving stroke is initiated, even if the motor 50 had previously been turned off for a long time interval. In a typical situation, at the end of the lifting stroke, the driver member 90 will be forced a very short distance downward (as viewed in FIGS. 2-11) by air pressure against the top of the piston 32, just as the lifter subassembly 60 stops rotating. That small displacement of the driver member will cause the lifter subassembly to rotate slightly in the reverse direction (which would be clockwise as viewed in FIGS. 5, 7-8, and 10-11), which will cause the lifter wheel 64 to rub against the kicker cam 100, which will slightly rotate the kicker cam 100 counterclockwise (in these same views) until its cam profile 104 comes into play and will lock up further rotation of the lifter wheel 64. This “lockup” situation will remain in place to prevent the driver member 90 from moving downward until some other action occurs to disturb the gears of the gear train 54.

When it is time to drive a fastener, the lifter subassembly 60 must literally get out of the way, or the driver member will never be able to move quickly downward to drive the fastener. At the beginning of a driving stroke, in this illustrated embodiment, the motor 50 is reversed (rotated in a second direction) for a moment, which causes the second gear 55 to rotate in a counterclockwise direction (as viewed on FIG. 7). Since the lifter subassembly 60 typically is locked up at this stage in the operational cycle, the lifter gear 56 cannot rotate; therefore, the entire lifter subassembly 60 will instead be forced to pivot to the left (as viewed in FIG. 7), by action of the pivot arm 70 rotating about its pivot axis 72. This forces the second (distal) end of the pivot arm 70 (along with the lifter subassembly 60) away from and clear of the driver member 90, and allows the driver to be forced quickly downward by the pressurized air above the piston 32, thereby driving a fastener from the exit end of the tool. The views of FIGS. 7 and 8 best show this operational mode configuration. (Note: there also are other features that can control the “driving” stroke.)

The lifter subassembly 60 may not be completely locked up at the beginning of a driving stroke. One reason would be if a human user is attempting to drive fasteners as quickly as possible, and perhaps the lifter subassembly 60 has not quite settled down after a return stroke, just as the user pulls the trigger on the nail driving tool to initiate the next driving stroke. If that indeed occurs, then the motor 50 is reversed for a moment (as per the above description), and the second gear 55 will be rotated (as before) in a counterclockwise direction (as viewed on FIG. 7). The lifter gear 56 could then slightly rotate in its reverse direction (clockwise on FIG. 7), and similarly the lifter wheel 64 will then rotate in the same direction (they are both keyed to the same lifter shaft 66).

When the lifter wheel rotates in that reversed direction, the kicker cam 100 will rotate counterclockwise (as seen on FIG. 8) until its cam profile 104 fully engages against the circumferential outer surface of the lifter wheel 64. As best seen on FIG. 8, when the kicker wheel 100 rotates a short distance in the counterclockwise direction, its cam profile 104 will be forced against a braking area 106 along the circumferential surface of the lifter wheel 64, which will then lock up the rotation of the lifter wheel 64. When that happens, the pivot arm 70 is forced to rotate in the counterclockwise direction about its pivot axis at its first end 72. This again forces the second end of the pivot arm 70 (along with the lifter subassembly 60) away from and clear of the driver member 90, and will allow the driver to be forced quickly downward by the pressurized air above the piston 32, thereby driving a fastener from the exit end of the tool.

In this illustrated embodiment, the output shaft of the electric motor 50 can be stopped and reversed to create the above-discussed reversing action of the lifter subassembly 60. It will be understood that an alternative method for reversing the lifter subassembly can be utilized instead of reversing the rotation of the electric motor. For example, the gearbox 52 (or some other mechanism) could be provided with parallel shafts, rotating in opposite directions, with a clutch to select which of the parallel shafts will be used to provide mechanical drive to the lifter subassembly 60. Other alternative mechanical reversing embodiments are contemplated.

Another feature readily visible on FIGS. 2 and 3 is a pre-load spring 80. In FIG. 2, the pre-load spring 80 approximates a straight line, which is its normal profile when the lifter subassembly is in its engagement position. However, the pre-load spring 80 is flexible, and as seen in FIG. 3, it can be bent outward when the lifter subassembly 60 is forced to its open (disengaged) position. The pre-load spring 80 exerts a force against the lifter subassembly 60 to ensure that it will stay within its engagement position such that it will not “pop out” from that engagement position during a lifting (return) stroke, unless a jam might otherwise occur. The pre-load spring is not necessarily required for this design, because the rotational dynamic forces will tend to keep the lifter subassembly 60 within its engagement position; however, the pre-load spring acts as a backup to ensure that function.

Figure 4:
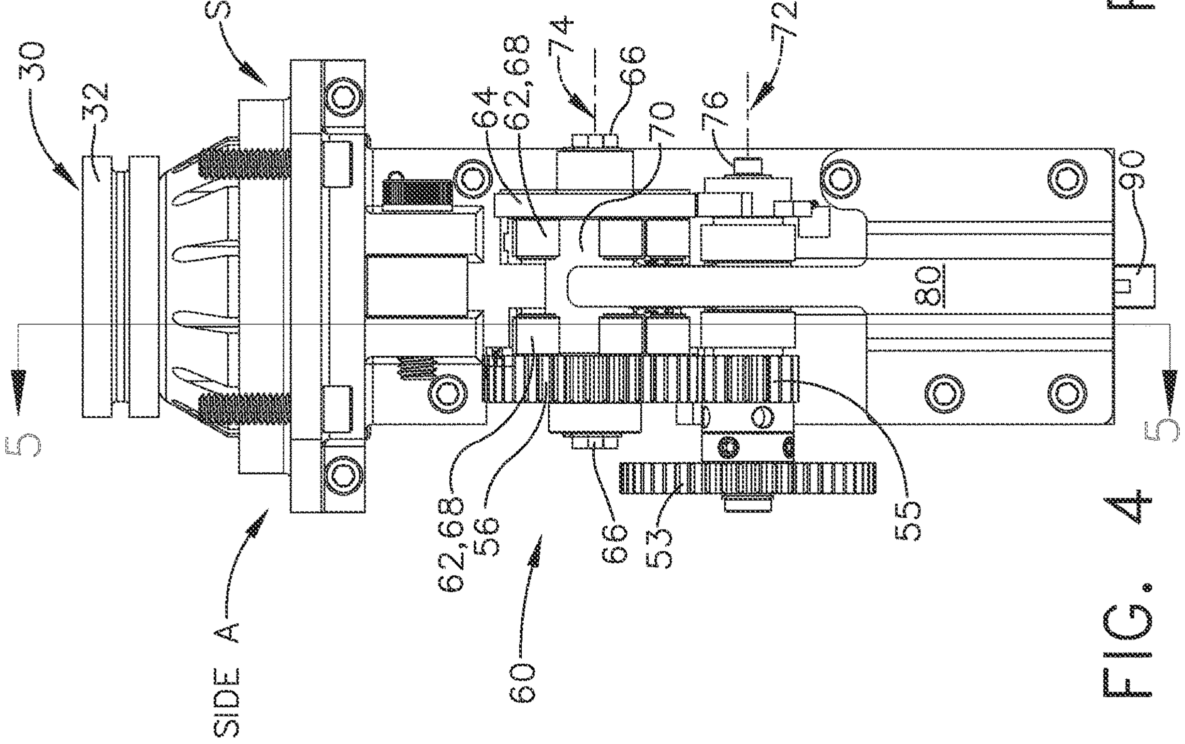
FIG. 4 is a front elevational view of the driver assembly of FIG. 2.

Referring now to FIGS. 4 and 5, the drive subassembly of the nailer tool is illustrated with the lifter subassembly 60 in its engagement (or engaged) position; this “engagement position” is also sometimes referred to herein as a “first position” of the lifter subassembly 60, and its pivot arm 70. In FIG. 4, the left side in this view is again side A, while the right side of this view is side B. The lifter gear 56 is on side A while the lifter wheel 64 is on side B. Both of these devices 56 and 64 each have a set of lifter pins 62 that protrude at right angles to the plane of the circular disk profile of either the gear or the wheel. The lifter shaft 66 is illustrated in this view. The centerline for the first end of the pivot arm is depicted at 72, which acts as the pivot point when seen in a view at a 90 degree angle (such as that of FIG. 5).

FIG. 5 is a section view taken along the line 5-5 of FIG. 4, and as such, the “side B” portion of the lifter subassembly is not visible. Therefore, the lifter gear 56 can be seen directly, without being blocked by the lifter wheel 64. FIG. 5 illustrates the positioning of the lifter pins 62 around the planar surface of the lifter gear 56. In this exemplary embodiment, the lifter pins 62 have rollers 68 that can rotate around the outer surfaces of the lifter pins. These rollers provide a more slippery surface, which can have advantages that will be discussed below. The driver member 90 can be seen in FIG. 5, along with several of its protrusions 92, which in this figure protrude in a direction toward the viewer of this drawing page. (See FIG. 12 for a better view of the driver member 90.) FIG. 5 also shows one of the lifter pins with roller at 68 fitting between two of the driver member protrusions 92, as would be typical when the lifter subassembly 60 is in its engagement position.

FIG. 5 also illustrates some of the details of the piston 32 and the piston stop 34. The piston stop 34 acts as a bumper, against which the bottom of the piston 32 will strike at the end of a driving stroke. In FIG. 5, the piston 32 is illustrated at its driven position, and as such, will need to be “lifted” upward (in this view) to its ready position before it can act to drive another fastener.

Another feature visible in FIG. 5 is a raised area at 94, on one of the driver member protrusions 92. As noted above, if the piston stop 34 exhibits significant mechanical hysteresis from wear and tear after many cycles of being struck by the piston 32, then it is possible for the driver member 90 to end up somewhat out of position with respect to where the lifter subassembly would typically engage that driver member.

The raised area 94 of the protrusion 92 can help to prevent a jam condition of the lifter pins against the driver member. If the driver member 90 ends up at a position such that the lifter pins 62 will miss the bottom edge of one of the protrusions 92, then a lifter pin might solidly impact against the planar surface of the protrusion 92, which potentially could lead to a jam condition. However, the rollers 68 will tend to prevent this jam condition from occurring, since the lifter pins (with the rollers on their surface) of this enhanced embodiment are more slippery, and hence would reduce the chance of a jam occurring in the first place. Secondly, when a lifter pin strikes against the protrusion that has the raised area 94, then instead of merely sliding over the surface of that protrusion, the lifter pin will tend to catch on that small raised area 94, thereby slightly displacing (lifting) the driver member 90 a small distance. As the lifter gear 56 continues to rotate, the "next" lifter pin 62 will then tend to engage an open area between the driver member protrusion with the raised area 94 and the next lower protrusion 92. Therefore, that next lifter pin will tend to fall between those two protrusions and begin a normal lift by catching the bottom edge of the "higher" driver protrusion 92, thereby beginning a return stroke and lifting the driver member back to its ready position.

Another major improvement in the design of this embodiment is the fact that the pivot arm 70 itself allows the lifter subassembly 60 to be somewhat moved away (to the left in the view of FIG. 5) from the driver member 90 during a lifting (return) stroke. In other words, if the lifter gear 56 happens to begin rotation and a lifter pin 62 strikes one of the driver member protrusions 92 at a point other than along its bottom edge, then the combination of the slight movement of the lifter pin and the fact that the pivot arm 70 can actually rotate about its pivot axis or pivot point 72, allows the entire lifter subassembly 60 to be moved a small distance to the left, thereby tremendously reducing the chance of a jam. This feature, in combination with the rollers 68 and the raised area 94 of the driver member protrusion 92, will tend to significantly reduce the chances of a jam. When the lifter subassembly 60 (and thus its pivot arm 70) displace a distance to the left—as seen in the views of FIGS. 7 and 8, that new displaced position is also sometimes referred to herein as a "second position" of the lifter and the pivot arm.

The new features of the improved driver assembly of the technology disclosed herein provide for a more robust system that allows for misalignment between the lifter and the driver "teeth" positions. Moreover, this more robust system is self-correcting with regard to various possible positions of the driver member 90 after it has finished a driving stroke, which often depends on how much wear and tear the piston stop 34 has endured during the lifetime of the nailer tool. The various features that provide for this robustness thus allow for misalignments, and therefore, the improved tool described herein should have an extended lifetime of use without major rebuilds.

Figure 8:
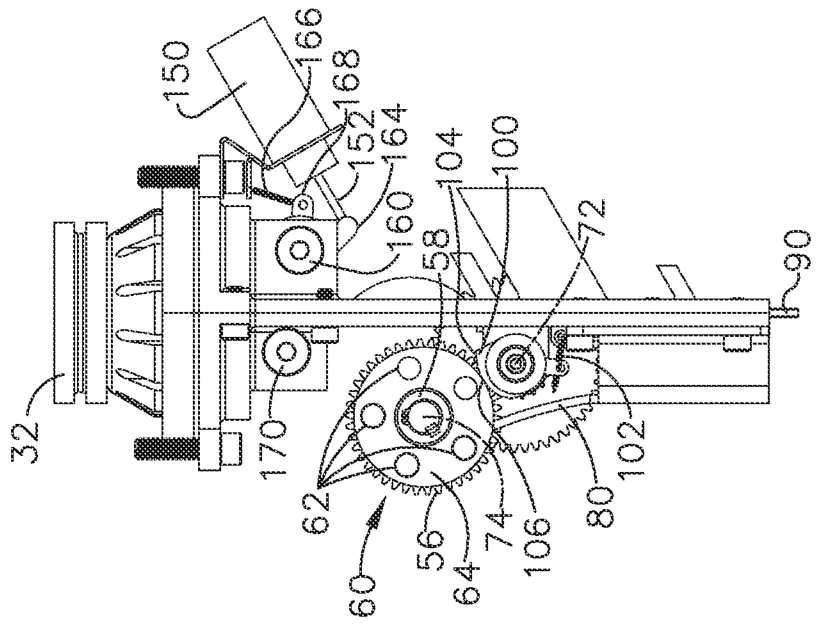
FIG. 8 is a side view of the tool of FIG. 6, taken along the line 8-8.
Figure 6:
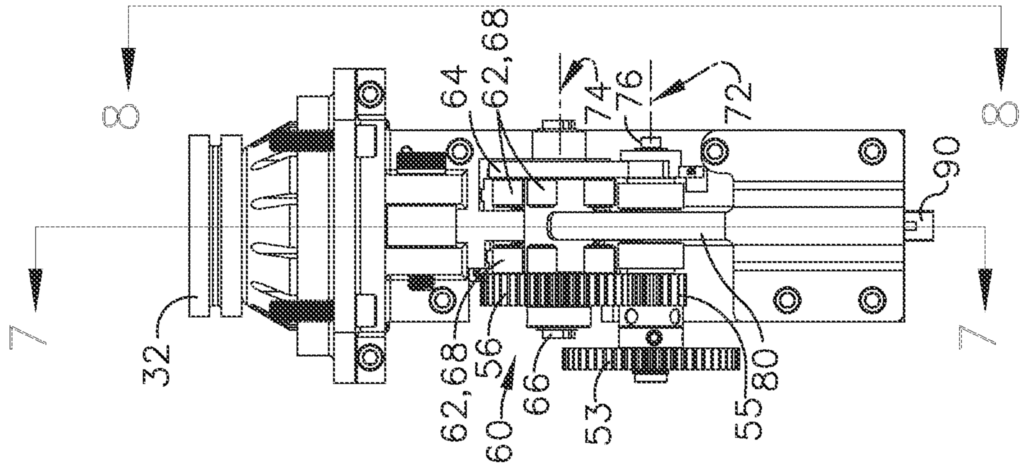
FIG. 6 is a front elevational view of the tool of FIG. 2, with the lifter subassembly in its open position.

FIGS. 6-8 are all views of the drive assembly in its open or non-engaged position. FIG. 7 is a cross-section view taken along the line 7-7 as seen on FIG. 6, and FIG. 8 is a side view taken along the line 8-8 as seen on FIG. 6. As can be easily seen in FIGS. 7 and 8, the lifter subassembly 60 has been rotated a small angular distance in the counterclockwise direction (as seen in these views). Therefore, the lifter pins 62 are out of position from engaging with the driver 90, thereby allowing the driver to be forced downward by the piston 32 and drive a fastener from the exit end of the tool. In these views of FIGS. 6-8, the piston 32 is in its driven position, and it is seated against the top of the piston stop 34.

The rotation of the pivot arm 70 will occur in this illustrated embodiment because the motor 50 rotation is momentarily reversed, which will cause the rotatable kicker 100 to rotate a small distance in the counterclockwise direction, if it is not already locked up against the lifter wheel 64. When that happens, the cam profile 104 of the kicker 100 will be forced against the circumferential outer surface of the lifter wheel 64, bringing the cam profile 104 hard against the braking area 106 of that lifter wheel surface. When that occurs, the lifter wheel will have its rotational movement quickly stopped, and the inertial moment of that rotation is transferred to the pivot arm 70, thereby causing it to rotate in the counterclockwise direction to the position depicted in FIGS. 7 and 8. FIG. 8 clearly shows the final position of the cam profile 104 against the braking area surface 106.

FIG. 8 also illustrates a kicker spring 102 that tends to hold the rotatable kicker 100 in its normal position, which is when the surface of the kicker 100 allows the lifter wheel 64 to slide against their respective surfaces, as the lifter wheel rotates. This occurs while the lifter subassembly 60 is in its engagement position (as seen in FIGS. 4 and 5).

Another feature illustrated in FIGS. 7 and 8 is a pivotable latch 160 that presses against the driver member 90. Latch 160 has an engagement extension at 162 that presses directly against one of the surfaces of the driver member 90 and, due to its physical configuration, the latch 160 will allow the driver member to be raised upward (as seen in these views), but will not allow the driver member to be moved downward. As such, the latch 160 can act as a safety device in a first mode, and in a second mode, it also acts as a "release device" that allows the driver member to drive a fastener.

Latch 160 includes an input extension at 164 that is connected to a push rod 152 of a solenoid 150. In addition, the latch 160 includes a protrusion that acts as a spring mount at 168, to which a latch spring 166 is attached. As part of this subassembly, there is a backup roller 170 that is on the opposite side of the driver member. Backup roller 170 prevents the driver member from deflecting away from the engagement extension 162 of the latch 160. Therefore, when the latch 160 is in its "normal" operating position (as seen in FIG. 7), it will be pressed hard against the flat surface of the driver member—on the right hand side as seen in FIG. 7—while the backup roller 170 is pressed hard against the driver member on the left-hand side of FIG. 7. This configuration prevents the driver member 90 from moving downward at all. (The tool would break before the driver member could be moved in this "latched" mode.)

The solenoid 150 is actuated when it is time to drive a fastener. The push rod 152 will push against the input extension 164 of the latch, which will then rotate the latch 160 a small amount in the clockwise direction (as seen in FIG. 7). When that occurs, the engagement extension 162 of the latch will release from the surface of the driver member, thereby allowing the driver to quickly move downward to drive a fastener from the exit end of the tool. Of course for this to happen, the lifter subassembly 60 must also be disengaged (moved to its open position), as seen in FIG. 7, or the driver member 90 will not be able to move quickly downward. In a typical driving sequence, the lifter subassembly 60 will be in its engagement position, such as that seen in FIGS. 10 and 11, and the rotation of the lifter gear 56 will tend to push the driver member slightly upward (in these views). This will allow the solenoid 150 to release the latch 160 from the surface of the driver 90, even if the motor had been turned off for a time before beginning this particular driving sequence.

Figure 11:
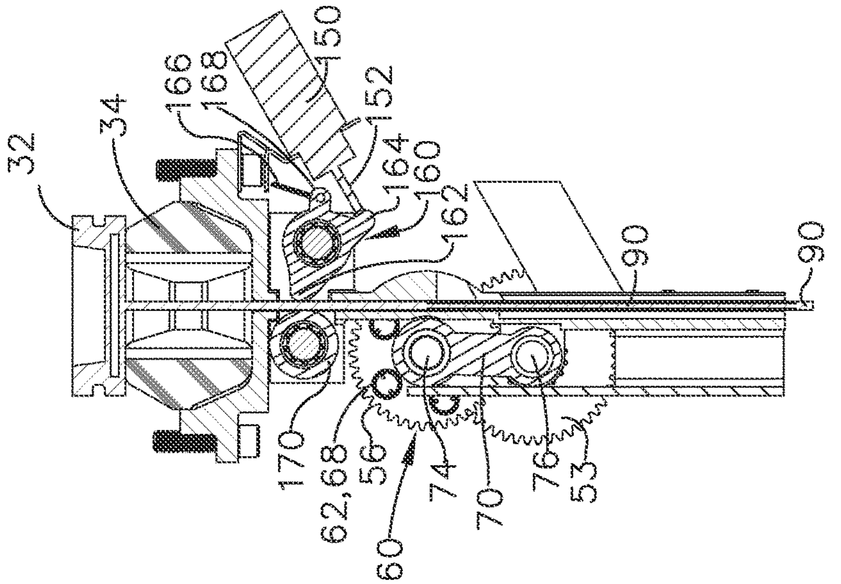
FIG. 11 is a cross-section view from the side taken along the line 11-11 in FIG. 9.
Figure 10:
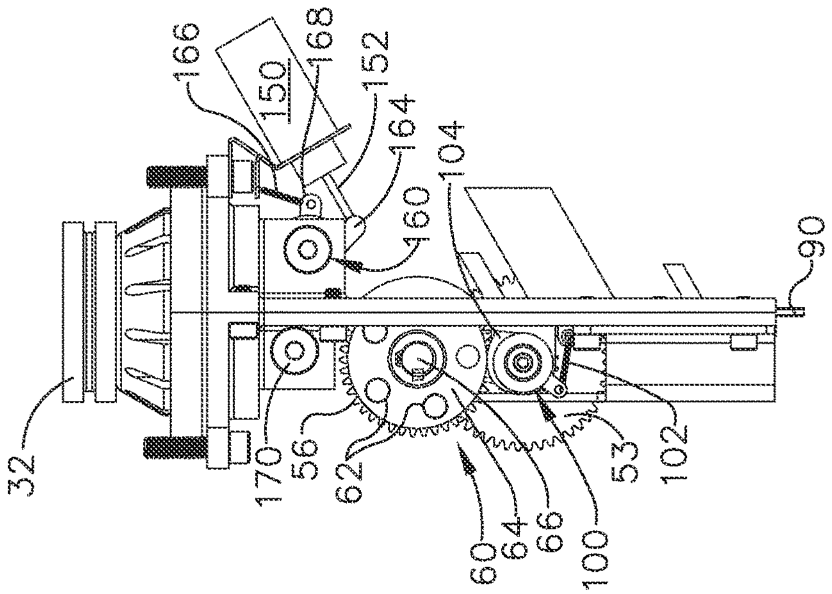
FIG. 10 is a side elevational view of the tool of FIG. 6, with the lifter subassembly in its engagement position.
Figure 9:
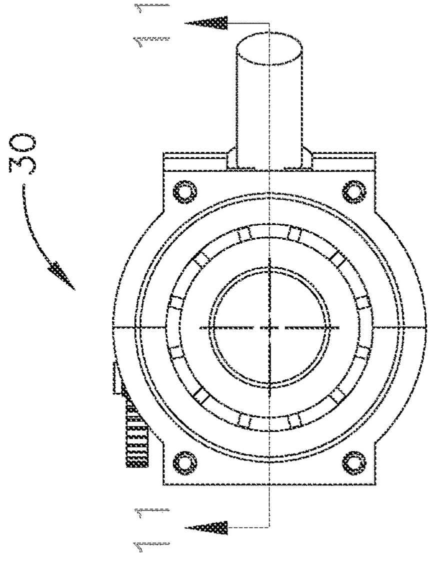
FIG. 9 is a top plan view of the tool of FIG. 2.

FIGS. 10 and 11 illustrate the drive assembly of the nailer tool from different angles compared to FIGS. 4 and 5. In FIGS. 10 and 11, the lifter subassembly 60 is in its engagement position, which allows the lifter pins to force the driver member 90 upward (in these views) if the lifter subassembly 60 is being rotated. Once again, the lifter pins 62, the rotatable kicker 100 with its cam profile 104, the pivot arm 70 (in its upright position), and the latch 160 with a solenoid are all depicted. FIG. 11 is a cross-section view taken along the lines 11-11, as seen in the top view of FIG. 9.

Figure 12:
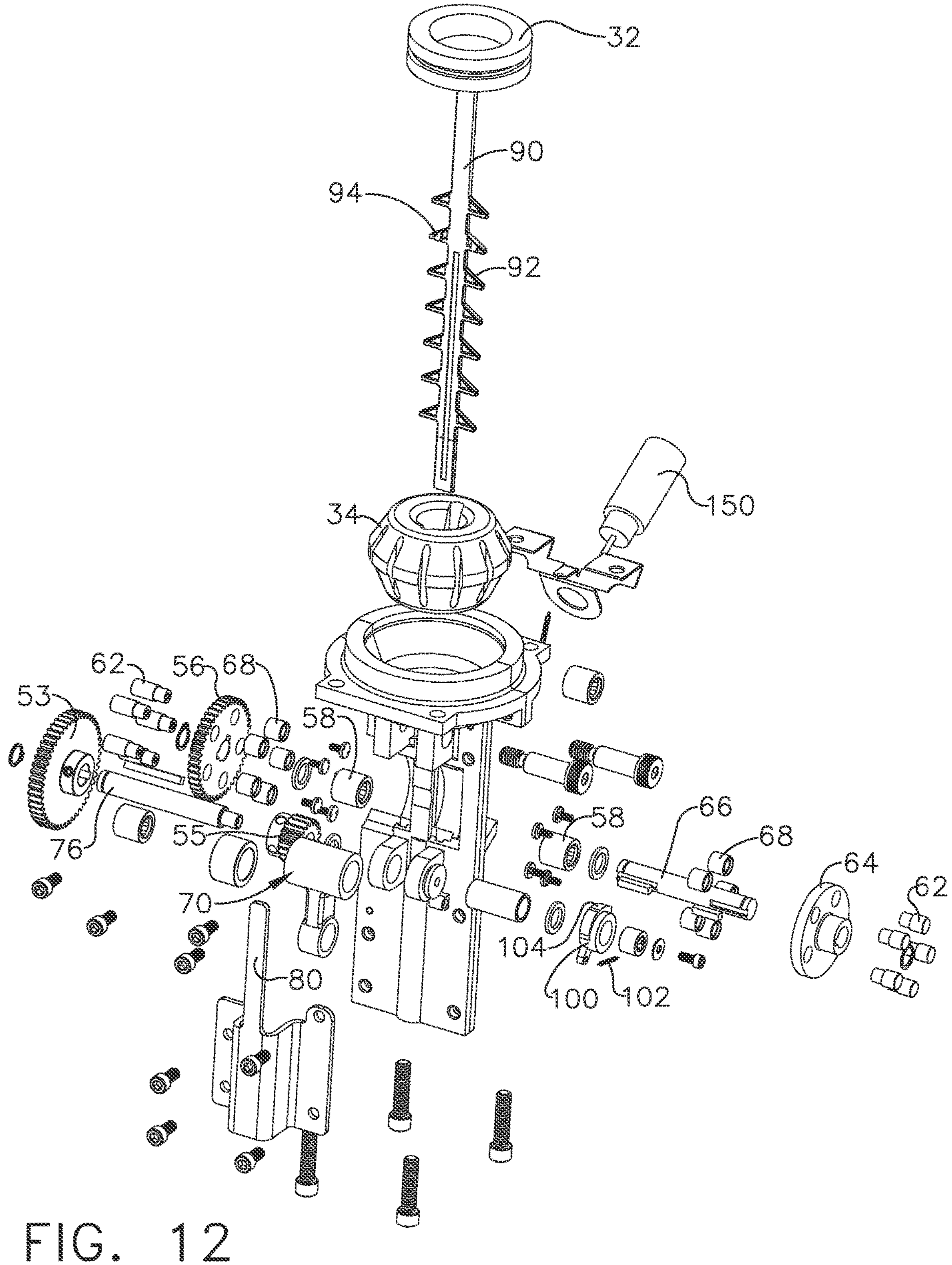
FIG. 12 is an exploded view of the tool of FIG. 2.

Referring now to FIG. 12, the driver assembly for the nailer tool is depicted in an exploded view that shows most of the component parts as individual items. Of particular note in this view is the driver member 90 with its multiple protrusions 92, including protrusions having the raised area 94. Also of note are the various components of the lifter subassembly, including the lifter gear 56, the multiple lifter pins 62, the lifter wheel 64, the lifter shaft 66, and the multiple rollers 68 that fit around the lifter pins 62. It should be remembered that the lifter shaft 66 is to be mounted at the second end of the pivot arm, and the pivot arm 70 is visible on FIG. 12.

Also of note on FIG. 12 are the multiple portions of the kicker 100, including a kicker spring 102 and the cam profile 104. Finally, the pre-load spring 80 and the "driving" solenoid 150 are illustrated on FIG. 12. There are, of course, many fasteners and other parts depicted in this exploded view that have not been described in detail herein.

Another important feature of the new design of the technology disclosed herein is that the driver assembly can have a variable lift stroke, if desired. This can be accomplished by controlling the number of rotations of the lifter gear 56 during a "lift" (return) stroke. A more precise way to control the variable lifting stroke would be to place a sensor proximal to the driver member, and allow the sensor to sense the position of the driver while the driver is being lifted, and then to halt the lifting or return stroke at an appropriate position, which would then become the "ready position" of that driver member for the next driving cycle.

If, for example, a user control is provided to allow a user to inform the nailer tool as to what overall power is to be required for the next series of fastener shots, then the variable lift stroke can become important. For example, if the type of wood is relatively soft, or if the fastener to be driven is a short nail (relatively speaking), then the amount of power needed to force that nail into the soft wood is reduced compared to larger nails or harder woods. A shorter lifting stroke will save electrical power for the battery pack that provides the electricity for the motor 50, thereby allowing the tool to continue use for a greater number of driving cycles, without changing the battery pack. Of course, if a longer nail or a harder wood is to be the target, then the user would need to inform the nailer tool that more power is needed and the lift stroke should be increased accordingly.

In the design illustrated and described herein, the lift stroke distance need not be tied directly to a strict number of full rotations of the lifter gear 56; there can be a fractional number of rotations, instead. In the design of an earlier nail-driving tool known as the Fusion™ tool, the lifter mechanism was required to stop at a fairly precise rotational position to hold the driver member at a specific place. More to the point, the lifter pins themselves were the actuating devices that held the driver member in place by virtue of the lifter pins directly holding against the bottom edge of the right-angle protrusions of the driver member. In the technology disclosed herein, the latch 160 holds the driver member in place once the lift stroke has been accomplished, and it makes no difference as to exactly how many lifter gear rotations were needed to position of the driver member for that next driving stroke distance. In other words, with this design, the precise position of the driver member when it is moved to its ready position is infinitely variable, and does not depend in the least upon an exact number of lifter rotations (or even an exact fraction of a lifter rotation that correspond to particular positions of the lifter pins 62 at the end of the lift or return stroke). This is another improvement of the new technology disclosed herein.

Figure 13:
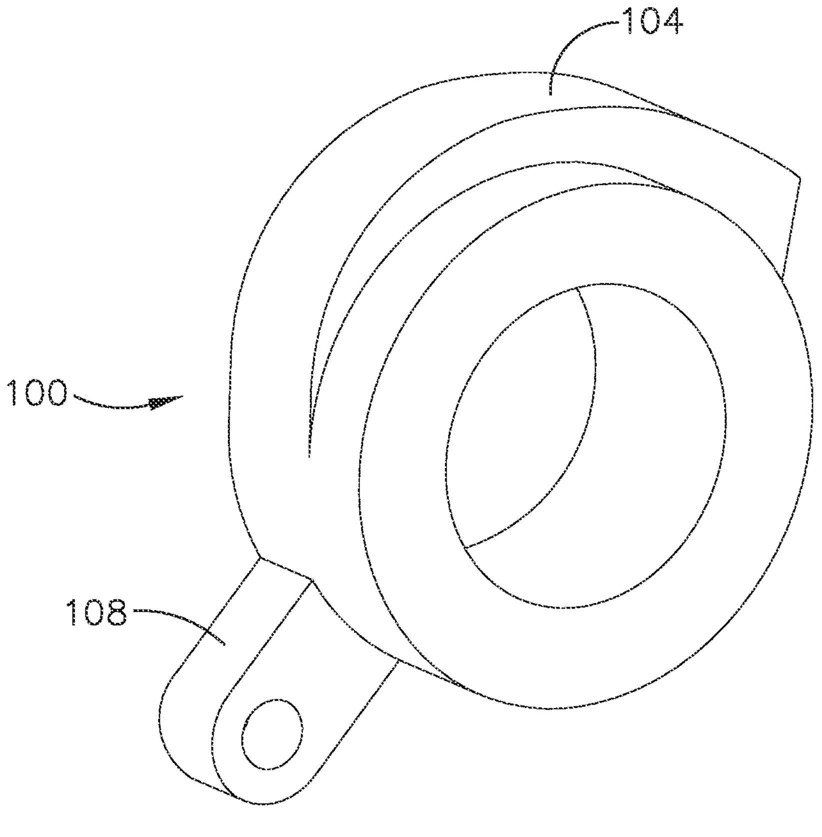
FIG. 13 is a perspective view of the rotatable kicker, used in the tool of FIG. 2.

FIG. 13 is a perspective view of the rotatable kicker 100. The cam profile is clearly visible at 104, and a spring mount extension is visible at 108.

It will be understood that the driver member 90 could be driven toward the exit end by a type of driver actuation device other than a gas spring. For example, the piston 32 could have a top circular area that is forced downward (in the view of FIG. 5) by a mechanical spring, which could be a fast-acting coil spring, for example, thereby also causing driver member 90 to quickly move downward (in this view). Or an alternative driver actuation device could use a different type of mechanical force, for example, applied by compressed foam. In such alternative embodiments, there would be no need for a cylinder at all, and instead the coil spring (or other device) would merely need a mechanical guide to keep it moving in a correct motion.

Figure 14:
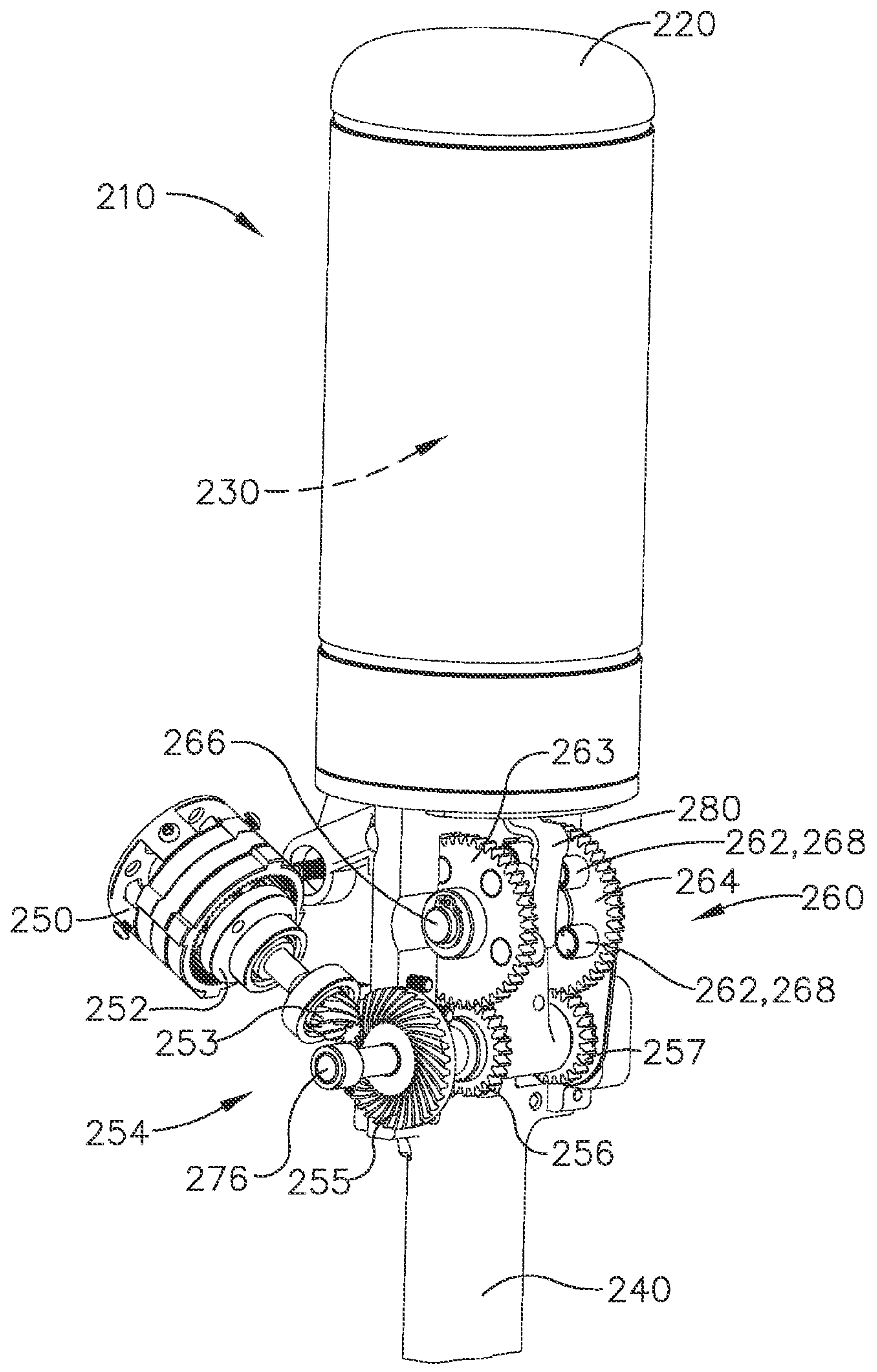
FIG. 14 is a perspective view from above and to one side of a second embodiment driver assembly for a framing nailer tool, as constructed according to the principles of the technology disclosed herein.

Referring now to FIG. 14, another alternative embodiment for a framing nailer tool is illustrated, generally designated by the reference numeral 210. Nailer tool 210 includes a pressure chamber 220 that includes a cylinder 230 with a movable driver actuation device, which is a piston 232 in this alternative embodiment. The movable piston 232 is connected to a driver member 290 (not seen in this view) that, when actuated, drives a fastener from a magazine (not seen in this view). The tool 210 includes a guide body 240, an electric motor with bracket 250, a pinion gear 251 (see FIG. 25) that receives the output shaft from the electric motor, a gearbox 252 that connects to the pinion gear 251, and a gear train set 254 that receive the output from the gearbox 252. The gear train set 254 includes a first bevel gear 253, a second bevel gear 255, and two (smaller) spur gears 256 and 257. The two smaller gears 256 and 257 are also referred to herein as "pivot gears," which are part of a pivot arm subassembly 271. Note that the second bevel gear 255 and the two pivot gears, 256 and 257, are all keyed to the same shaft (i.e., a pivot shaft 276), so these gears 255, 256, and 257 always rotate together.

A lifter subassembly 260 includes a lifter shaft 266 that extends from the left side (in the view of FIG. 1) to the right side (in this view); the lifter shaft 266 is mechanically connected to a pair of (larger) lifter gears 263 and 264. In the view of FIG. 1, the left side of the lifter subassembly 260 is sometimes referred to as "side A" while the right side in this view is sometimes referred to as "side B," with regard to terminology for the lifter subassembly. The first pivot gear 256 and first lifter gear 263 are, therefore, on side A of the subassembly 260, while the second pivot gear 257 and second lifter gear 264 are on side B of that subassembly. Both lifter gears 263 and 264 rotate together, via lifter bearing(s) 258 (see FIG. 18) and the lifter shaft 266.

The electric motor 250 is commanded to rotate by an electronic controller (not shown) when it is desired to lift the combination piston 232 and a driver member 290 from their "driven position" to their initial drive or "ready position." As will be explained below, when the lifter gears 263 and 264 rotate, via action of the electric motor 250, there are mechanical components that force the driver member 290 upward (with respect to the view of FIG. 14), so that the piston is moved further into the pressure chamber 220, which is where the piston will remain at the "ready position," until it drives the next fastener.

Both lifter gear 263 and 264 have "pins" 262 that protrude from the lifter gear and the lifter shaft at approximately right angles to the circular planes of the gear 263 or gear 264, respectively. These lifter pins 262 are visible on FIG. 1, and they are illustrated in more detail in some of the other views of these drawings. In other words, the lifter gears each comprise rotatable disks that each have a plurality of lifter pins extending from a surface of those rotatable disks, and it is the action of these lifter pins 262 that engages the driver member 290 to force it upward, from its driven position to its ready position.

Figure 15:
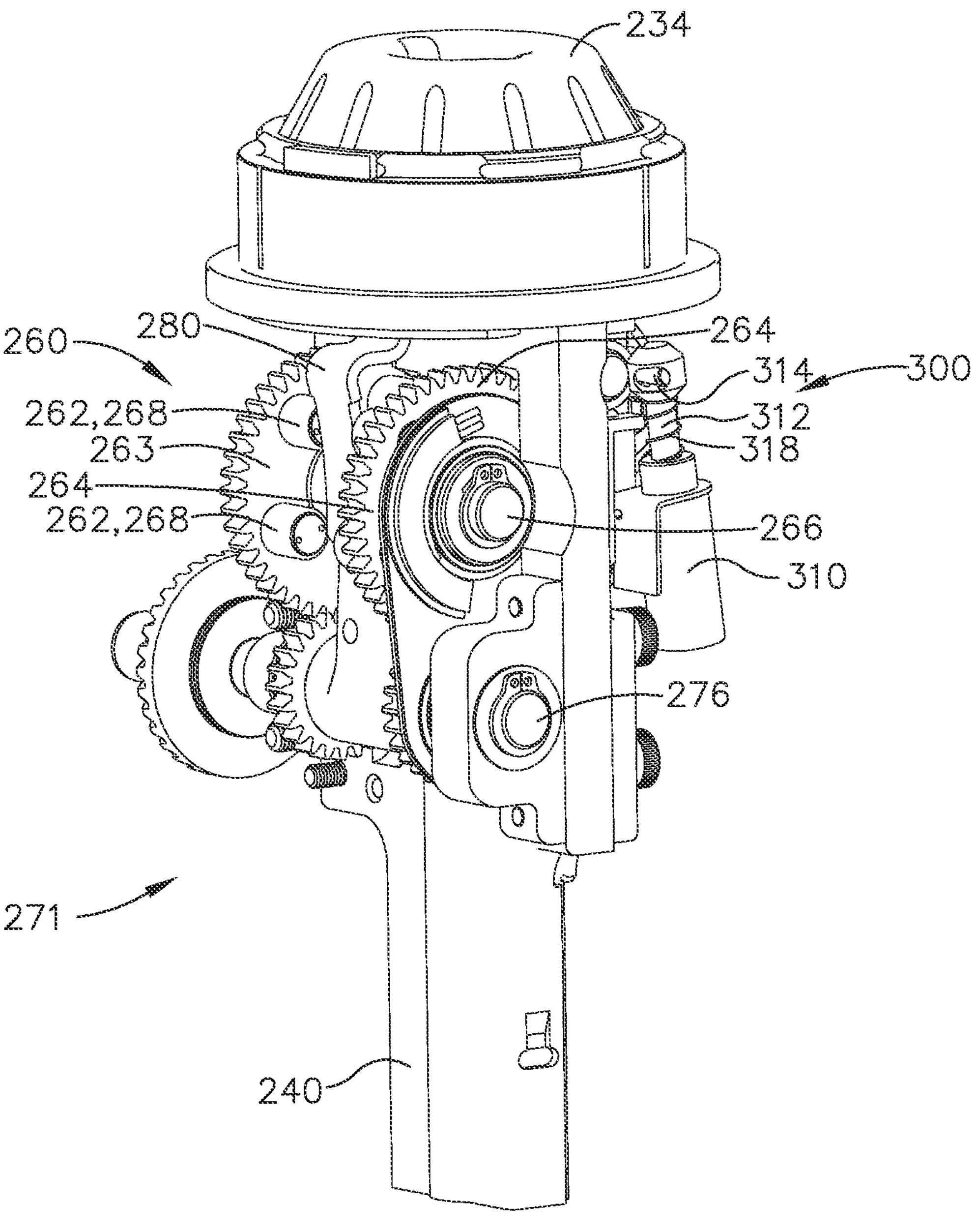
FIG. 15 is a perspective view from above and to the side of the driver assembly for the tool depicted in FIG. 14, showing a lifter subassembly in the engagement position.
Figure 16:
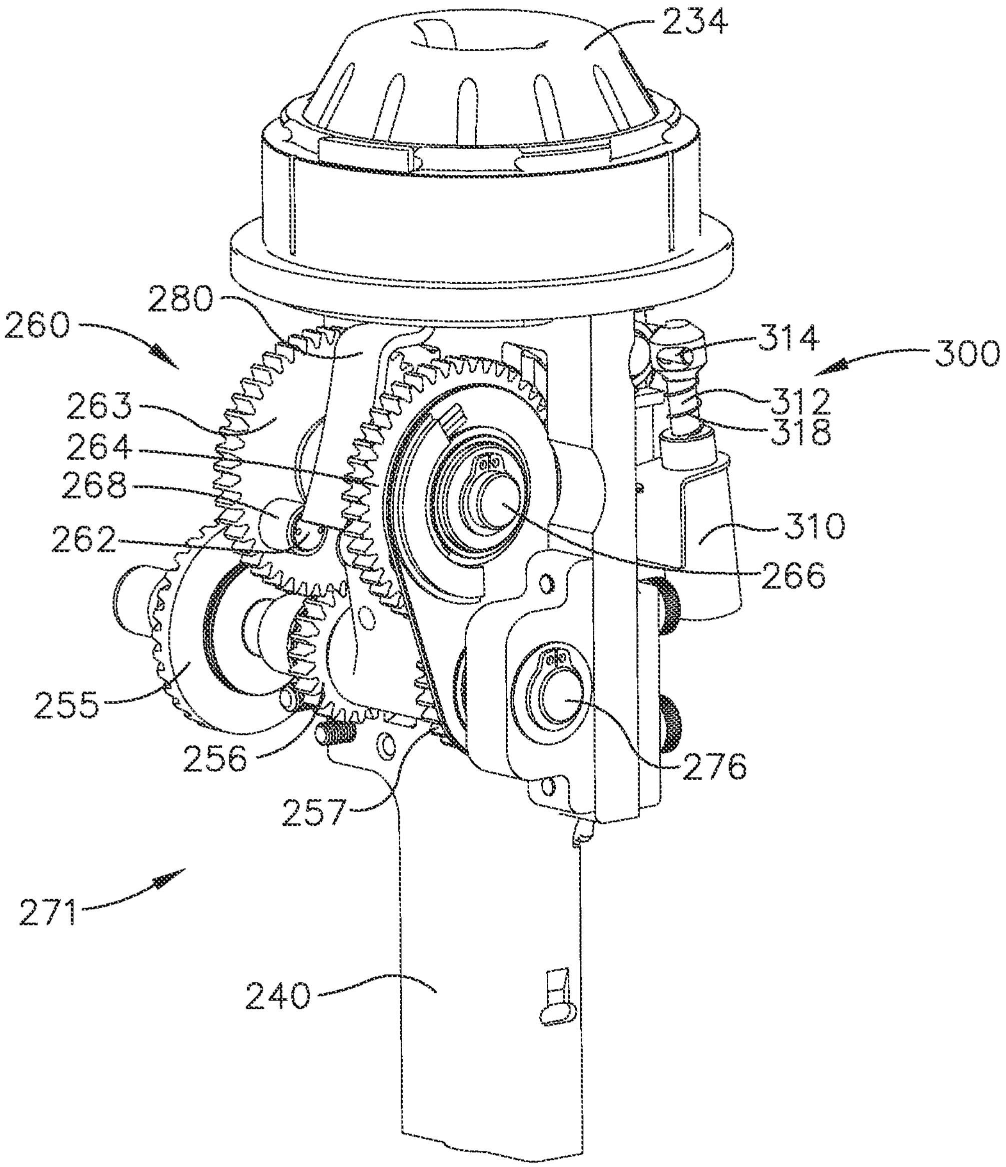
FIG. 16 is a perspective view from above and to the side of the driver assembly for the tool depicted in FIG. 14, showing a lifter subassembly in the open, non-engagement position.

Referring now to FIGS. 15 and 16, these two views show the drive assembly without the pressure chamber and cylinder, and without the electric motor and certain other portions of the gear train. FIG. 15 illustrates the drive assembly with the lifter subassembly in its "engagement position," while FIG. 16 shows the same equipment with the lifter subassembly in its "open position." In FIG. 16, the opening has been exaggerated for clarity. In these views, the lifter pins are illustrated at 262, and there are three of them on each side of the lifter subassembly 260. In other words, there are three lifter pins 262 protruding at right angles from the lifter gear 263, and there are three more lifter pins 262 protruding at right angles from the lifter 264. In this manner, both sides of the driver member 290 will be equally engaged by the lift mechanism.

Figure 20:
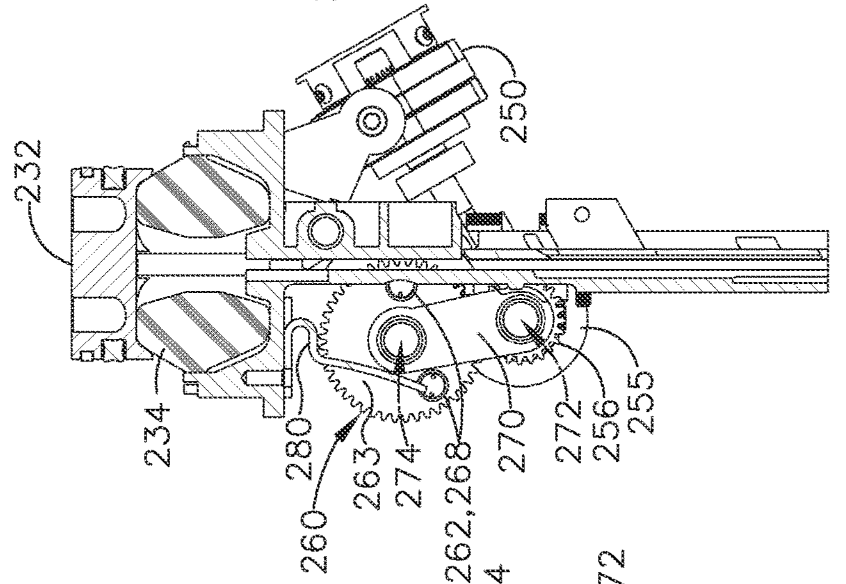
FIG. 20 is a side cross-sectional view of the tool of FIG. 19, taken along the line 20-20.

One important feature of this construction is a pivot arm 270, which cannot be easily seen on FIGS. 15 and 16, but can be seen on many other views, especially in the cross-section view of FIG. 20. The pivot arm has a first end at 272, which acts as a pivot axis. The second end of the pivot arm is at 274, which is the longitudinal axis for the rotatable lifter shaft 266. The second end is the distal end, while the first end is the proximal end, with respect to the guide body 240. As can be seen when comparing FIG. 15 from FIG. 16, the lifter subassembly 260 can be swung away from the guide body 240 to become disengaged (as seen in FIG. 16), or the lifter subassembly 260 can remain engaged by staying nested with the guide body 240 (as seen in FIG. 15). These perspective views of FIGS. 15 and 16 do not readily show the mechanical effects of being engaged or disengaged, but the later views show those effects clearly. The pivot arm 270 thus becomes a "movable arm" having displacement that is limited to a maximum travel of between a first position and a second position, inclusive. The first position is when the lifter subassembly 260 is engaged (i.e., nested with the guide body 240), and the second position is when the lifter subassembly has been disengaged such that the movable (pivot) arm 270 has displaced (pivoted) its maximum distance away from its engagement (nested) position.

Figure 18:
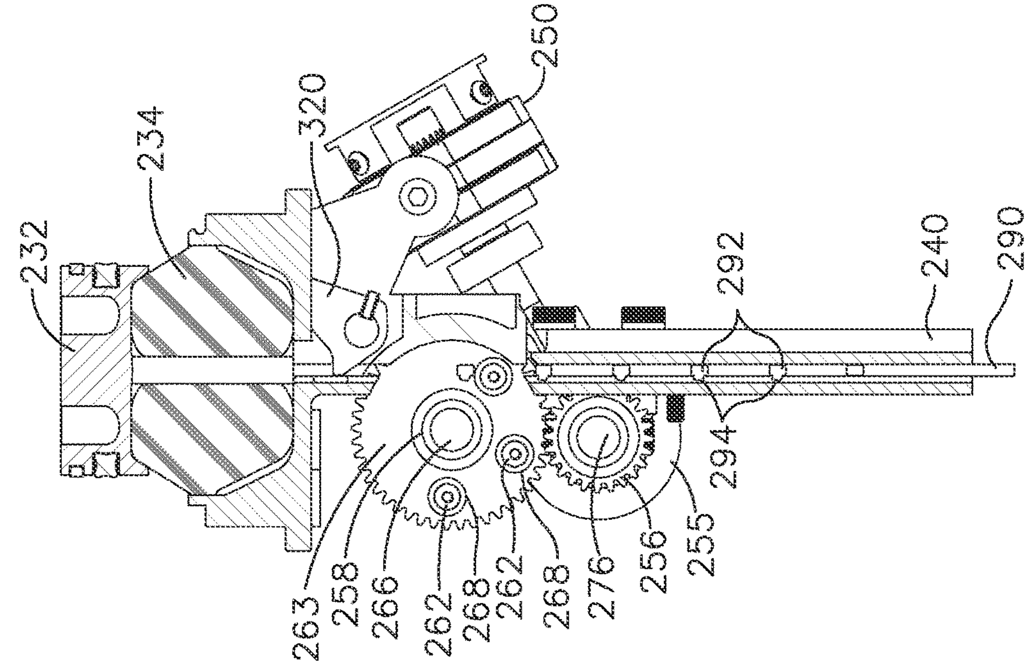
FIG. 18 is a cross-section view taken along the line 18-18 in FIG. 17, showing the tool from its side.

When the lifter subassembly 260 rotates in a first direction, the lifter pins 262 tend to engage teeth 292 of the driver member 290, and when the pins 262 actually engage those driver teeth 292, then the driver member 290 is "lifted" from its driven position to its ready position (thereby making a return stroke). Note that the driver teeth 292 are often referred to herein as "spaced-apart protrusions." In other words, when the lifter gears 263 and 264 are rotated in that first direction, which is counterclockwise in the view of FIG. 18, the lifter pins 262 will engage with spaced-apart protrusions 292 of the driver member 290, thereby forcing the driver 290 to be lifted upward (in these views), from the driven position to the ready position. FIG. 18 shows an example of how the one of the lifter pins 262 can fit within a space between the protrusions 292 of the driver member 290. In very general terminology again, the protrusions 292 also represent a "first contacting surface," while the lifter pins 262 also represent a "second contacting surface."

The driver member 290 must be at its "ready position" before driving a fastener, and the lifter pins 262 are the mechanical devices that previously would have moved the driver member to that ready position. In most circumstances, the lifter pins 262 will remain in contact with the driver member's protrusions 292 before the driving stroke is initiated, even if the motor 250 had previously been turned off for a long time interval. The lifter pin 262 will remain in contact with one of the driver member's protrusions 292, thereby preventing the driver member 290 from moving downward until the next driving action occurs.

In this alternative embodiment 210, there is a latch mechanism 300 that prevents the driver member 290 from moving through a driving stroke under the wrong conditions. Latch mechanism 300 includes a solenoid 310 that is controlled by the tool's electronic system controller (not shown), a spring-loaded solenoid plunger (or push rod) 312, a latch push arm 314, a latch shaft 316, and a rotatable latch member 320. A coil spring 318 surrounds the plunger 312.

Figure 22:
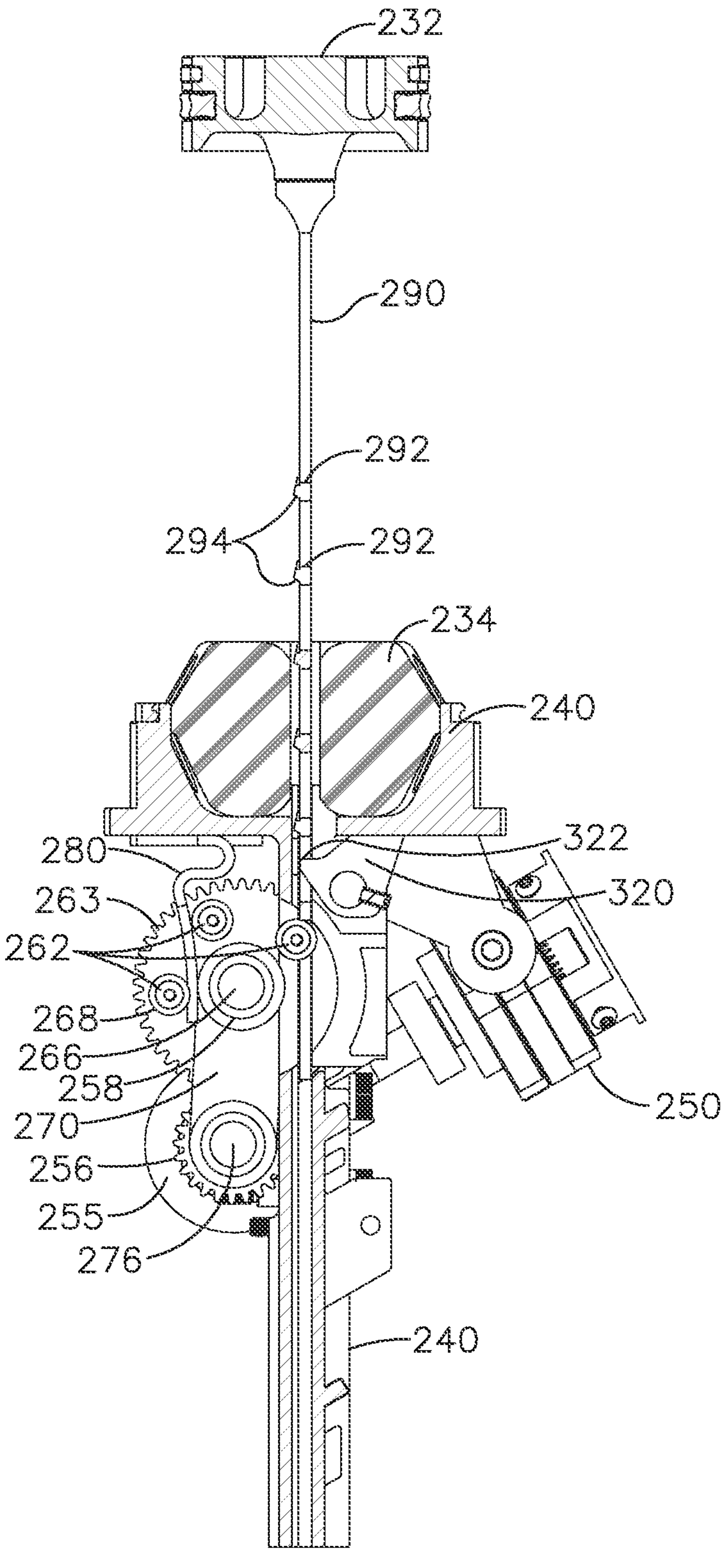
FIG. 22 is a side elevational view in partial cross-section of the tool of FIG. 15, with the lifter subassembly in its engagement position, with the driver at its ready position, and with the latch in its engagement position, after a return stroke.

The latch member 320 is shaped with an extension 322 that is positioned to either "catch" (i.e., engage) the driver member's protrusions 292, or to not catch (i.e., to be disengaged from) those driver member protrusions 292. In the view of FIG. 22, the latch mechanism is engaged, as can be seen by its extension 322 being directly in the path of the driver member protrusions 292, thereby preventing the driver member from "driving." In this mode of operation, the extension 322 would catch the nearest tooth 292 of the driver member 290, if that driver member started to move unexpectedly downward (in this view), and thus extension 322 would limit the driver member's movement to a very short distance—too short to drive a fastener. This important safety feature thereby prevents a person being injured in the event that such person might attempt to open the tool (for servicing, for example), or otherwise somehow cause the driver member 290 to slip past the lifter pin 262.

Figure 23:
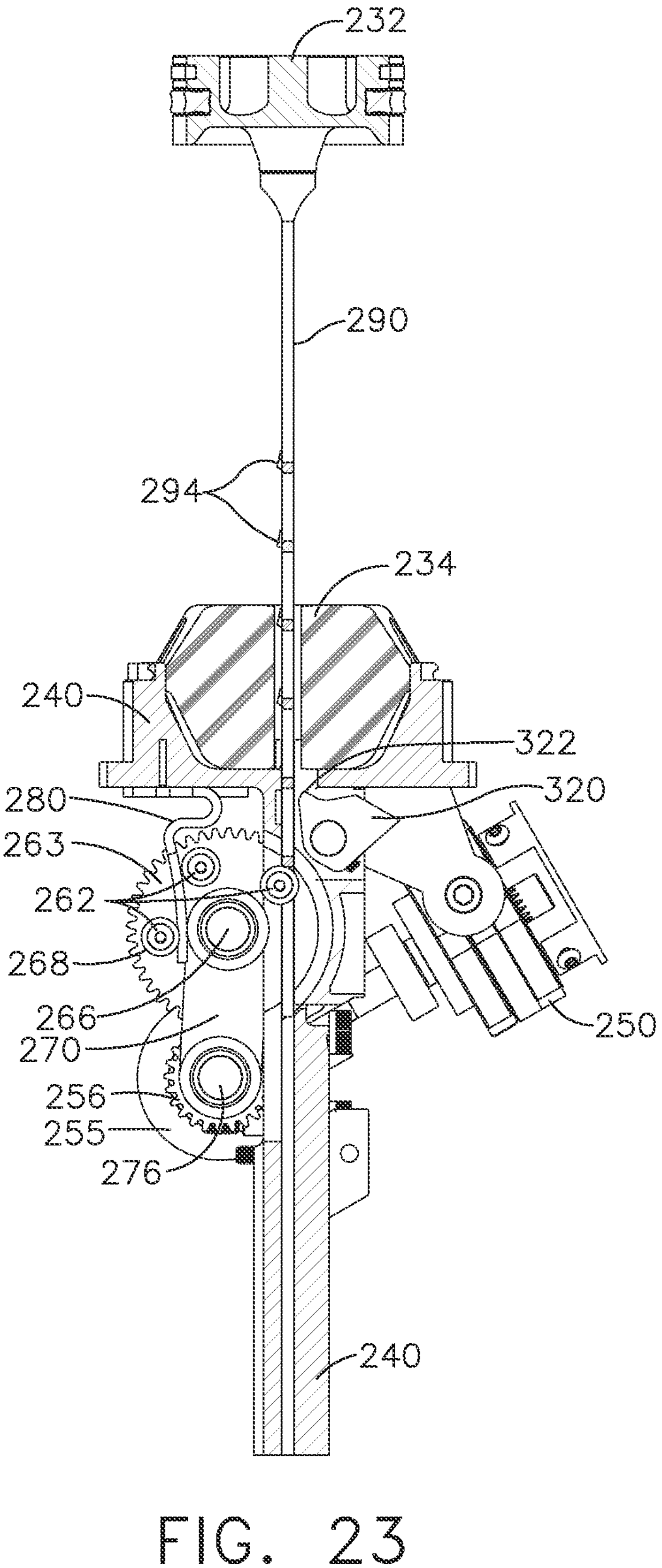
FIG. 23 is a side elevational view in partial cross-section of the tool of FIG. 15, with the lifter subassembly in its engagement position, with the driver at its ready position, and with the latch in its disengaged position, with the tool just beginning a driving stroke.

In FIG. 23, the latch mechanism 300 has been disengaged (by energizing the solenoid 310), and the latch extension 322 is not in an engagement position, and thus would not catch any of the driver member protrusions 292 if the driver member 290 were to move downward. This is the mode of operation that occurs just before a true (i.e., a planned) shot is to occur; the latch has been disengaged, but the lifter pin 262 is still holding one of the driver teeth 292 in place, thereby preventing a downward driving stroke from occurring quite yet. In this operational state, the only thing that needs to occur for commencing the driving stroke is to move the lifter pin 262 out of the way.

Figure 24:
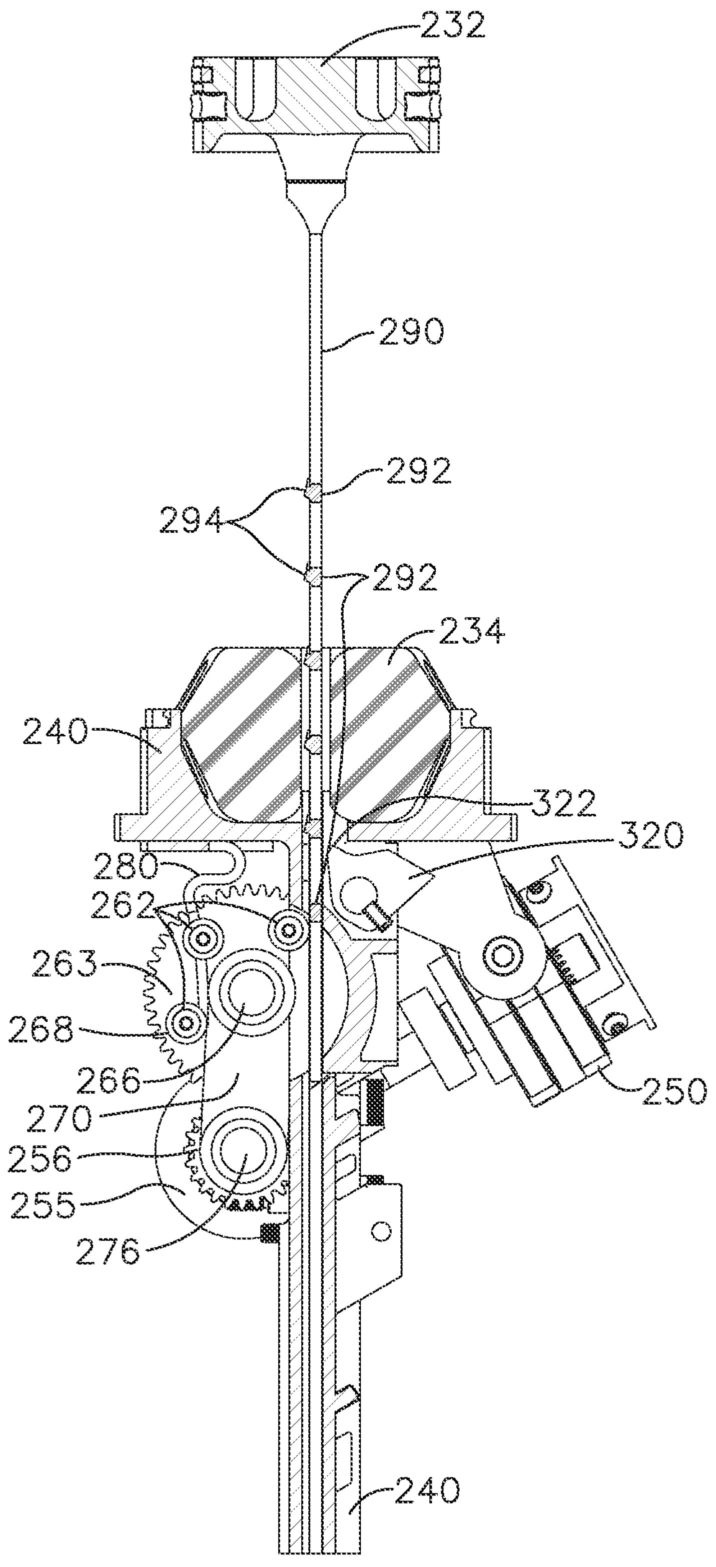
FIG. 24 is a side elevational view in partial cross-section of the tool of FIG. 15, with the lifter subassembly in its disengaged position, with the driver at its ready position, and with the latch in its disengaged position, with the tool at the next stage in beginning a driving stroke.

In FIG. 24, both the latch mechanism and the lifter subassembly 260 have been disengaged, and the driver member 290 is, therefore, ready to be pushed downward (in the views of FIGS. 15-24) to create a driving stroke of the piston/driver combination. The round lifter gear 263 has been rotated counterclockwise (as seen in FIG. 24) to the position where the "last" lifter pin 262 has just now cleared out of the way of the prospective downward movement of the driver member 290, by releasing contact between the lifter pin 262 and the driver member's protrusion (or tooth) 292. It will be understood that this view of FIG. 24 only exists for a tiny moment of time, since the pressure against the top of the drive piston 232 will immediately and quickly force downward the driver/piston combination, to drive a fastener in a driving stroke.

When it is time to correctly drive a fastener, the lifter subassembly 260 must literally get out of the way, or the driver member will never be able to move quickly downward to drive the fastener. At the beginning of a driving stroke, in this illustrated alternative embodiment, the motor 250 is energized to rotate the gear train 254, which in turn rotates both lifter gears 263 and 264. Once the "final" lifter pin 262 moves to a release position where it clears the prospective path of the driver member 290, the driver member will immediately be allowed to be forced quickly downward by the pressurized air above the piston 232, thereby driving a fastener from the exit end of the tool. (Note: there also are other features that can control the "driving" stroke.)

As can be seen on FIG. 24, there are three lifter pins 262 per lifter gear 263 (and lifter gear 264, not visible in this view). These three lifter pins 262 are not spaced at equal distances along the outer diameter of the lifter gears. Instead, there is a gap between the "final" lifter pin that is closest to the driver protrusion 292 on FIG. 24 and the "next" lifter pin that would make contact with the driver member 290, if the lifter gear 263 would rotate further in the counterclockwise direction. This gap allows the driver member 290 to "drive" without requiring the lifter subassembly to be pivoted out of the way. In other words, to allow the driver member to undergo a driving stroke, the pivot arm subassembly 271 does not need to "release" or pivot away at all from the guide body 240. This is quite different from the embodiments illustrated in FIGS. 1-13.

Figure 17:
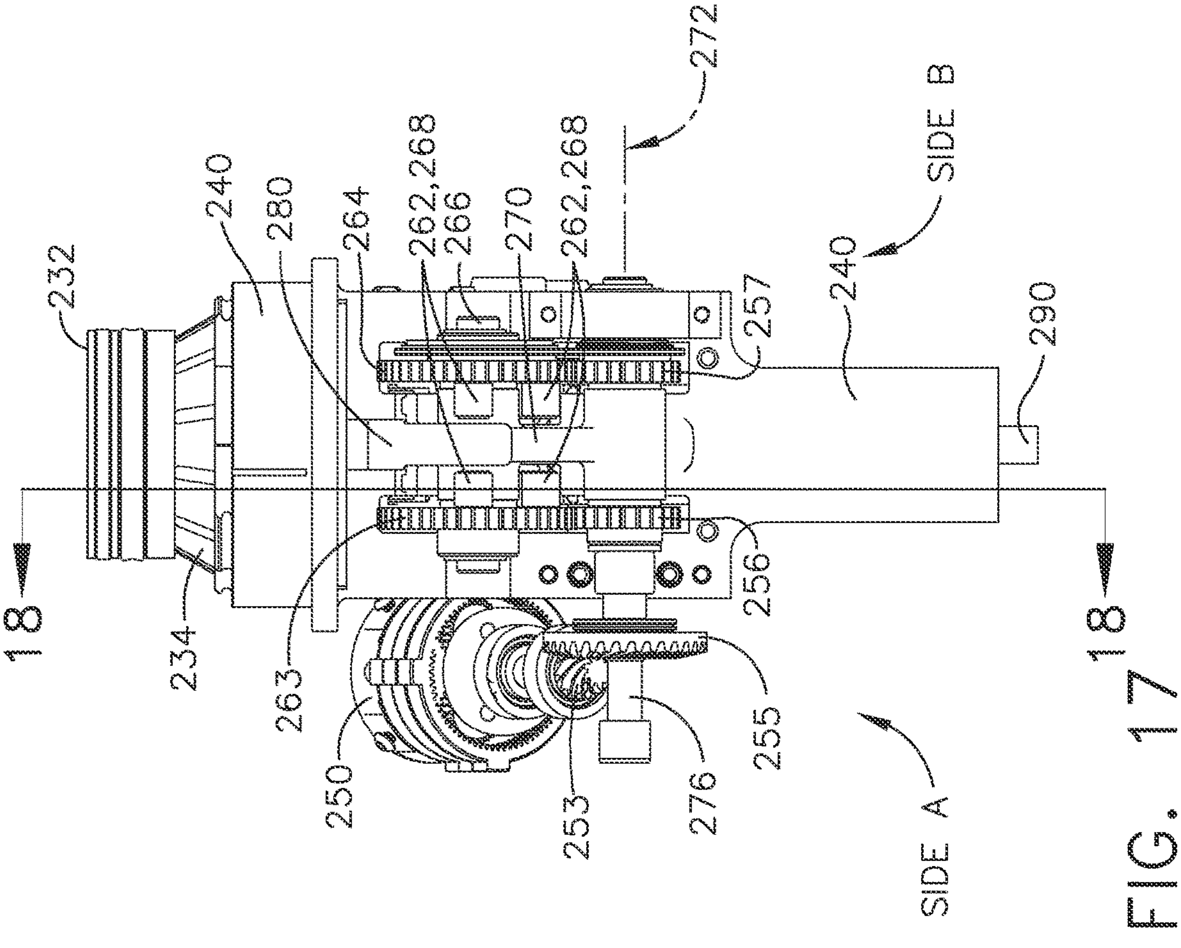
FIG. 17 is a front elevational view of the driver assembly of FIG. 15.

Referring now to FIGS. 17 and 18, the drive subassembly of the nailer tool is illustrated with the lifter subassembly 260 in its engaged (or engagement) position; this "engagement position" is also sometimes referred to herein as a "first position" of the lifter subassembly 260, and its pivot arm 270. In FIG. 17, the left side in this view is again side A, while the right side of this view is side B. The lifter gear 263 is on side A while the lifter gear 264 is on side B. Both of these gears 263 and 264 each have a set of lifter pins 262 that protrude at right angles to the plane of the circular disk profile of either such gear. The lifter shaft 266 is illustrated in this view. The centerline for the first end of the pivot arm is depicted at 272, which acts as the pivot point when seen in a view at a 90 degree angle (such as that of FIG. 18).

FIG. 18 is a section view taken along the line 18-18 of FIG. 17, and as such, the "side B" portion of the lifter subassembly is not visible. Therefore, the lifter gear 263 can be seen directly, without being blocked by the other lifter gear 264. FIG. 18 illustrates the positioning of the lifter pins 262 around the planar surface of the lifter gear 263. In this exemplary embodiment, the lifter pins 262 have rollers 268 that can rotate around the outer surfaces of the lifter pins. These rollers provide a more slippery surface, which can have advantages that will be discussed below.

The driver member 290 can be seen in FIG. 18, along with several of its protrusions 292, which in this figure protrude in a direction toward the viewer of this drawing page. (See FIG. 25 for a better view of the driver member 290.) FIG. 18 also shows one of the lifter pins (with roller at 268) fitting in a space between two of the driver member protrusions 292, as would be typical when the lifter subassembly 260 is in its engagement position. Note that on FIG. 18, the driver member 290 is illustrated in its "driven" position, after a driving stroke has occurred. Once the driver member moves to this position, it cannot be "fired" again until it has been lifted back to its "ready" position, by way of a return stroke, caused by the lifter subassembly 260.

FIG. 18 also illustrates some of the details of the piston 232 and the piston stop 234. Piston stop 234 acts as a bumper, against which the bottom of the piston 232 will strike at the end of a driving stroke. In FIG. 18, the piston 232 is illustrated at its driven position, and as such, will need to be "lifted" upward (in this view) to its ready position before it can act to drive another fastener. (As will be understood, the piston and driver are mechanically connected in this illustrated embodiment, and as such, always act together.)

Another feature visible in FIG. 18 is a raised area at 294, on most of the driver member protrusions 292. As noted above, if the piston stop 234 exhibits significant mechanical hysteresis from wear and tear after many cycles of being struck by the piston 232, then it is possible for the driver member 290 to end up somewhat out of position with respect to where the lifter subassembly would typically engage that driver member (at least, as compared to where the driver member 290 used to end up when the entire tool was new).

The raised area 294 of the protrusions 292 can help to prevent a jam condition of the lifter pins against the driver member. If the driver member 290 ends up at a position such that the lifter pins 262 will miss the bottom edge of one of the protrusions 292, then a lifter pin might solidly impact against the planar surface of the protrusion 292, which potentially could lead to a jam condition. However, the rollers 268 will tend to prevent this jam condition from occurring, since the lifter pins (with the rollers on their surface) of this improved embodiment are more slippery, and hence would reduce the chance of a jam occurring in the first place. Secondly, when a lifter pin strikes against a protrusion 292 that has the raised area 294, then instead of merely sliding over the surface of that protrusion, the lifter pin 262 will tend to catch on that small raised area 294, thereby slightly displacing (lifting) the driver member 290 a small distance. As the lifter gears 263 and 264 continue to rotate, the "next" lifter pin 262 will then tend to engage (move into) an open area between the driver member protrusion with the raised area 294 and the next lower protrusion 292. Therefore, that next lifter pin 262 will tend to fall between those two protrusions and begin a normal lift by catching the bottom edge of the "higher" driver protrusion 292, thereby beginning a return stroke and lifting the driver member 290 back to its ready position.

Another major improvement in the design of this alternative embodiment is the fact that the pivot arm 270 itself allows the lifter subassembly 260 to be somewhat moved away (to the left in the view of FIG. 18) from the driver member 290 during a lifting (return) stroke. In other words, if the lifter gears 263 and 264 happen to begin rotation and a lifter pin 262 strikes one of the driver member protrusions 292 at a point other than along its bottom edge, then the combination of the slight movement of the lifter pin, and the fact that the pivot arm 270 can actually somewhat rotate about its pivot axis or pivot point 272, allows the entire lifter subassembly 260 to be moved a small distance to the left (as viewed on FIG. 18), thereby tremendously reducing the chance of a jam. This feature, in combination with the rollers 268 and the raised areas 294 of the driver member protrusions 292, will tend to significantly reduce the chances of a jam.

The new features of the improved driver assembly of the technology disclosed herein provide for a more robust system that allows for misalignment between the lifter and the driver "teeth" positions. Moreover, this more robust system is self-correcting with regard to various possible positions of the driver member 290 after it has finished a driving stroke, which often depends on how much wear and tear the piston stop 234 has endured during the lifetime of the nailer tool. The various features that provide for this robustness thus allow for misalignments, and therefore, the improved tool described herein should have an extended lifetime of use without major rebuilds.

It should be noted that all embodiments of the technology disclosed herein include this more robust feature that allows the lifting mechanism to automatically release from mechanical contact with the driver member, if necessary to prevent a jam, at times when the lifting mechanism is attempting to implement a return stroke by lifting the driver/piston combination from the driven position to the ready position. This release condition should not be necessary for "normal operating conditions," because the lifter pins should readily fit into a space between driver teeth and thereby make initial contact with the bottom edge of one of those driver teeth. However, when "abnormal operating conditions" exist, the driver may have stopped at an improper location along its linear movement, and the driver teeth may thereby be completely out of proper positions as the lifter pins attempt to make contact with those driver teeth. This "abnormal operating condition" scenario is precisely what the automatic release function of the lifting mechanism is designed to handle, so that the lifter gears can be automatically pivoted away from the driver member, and almost always prevent a jam or other unstable condition from arising, during an attempted return stroke of the driver/piston combination.

Figure 21:
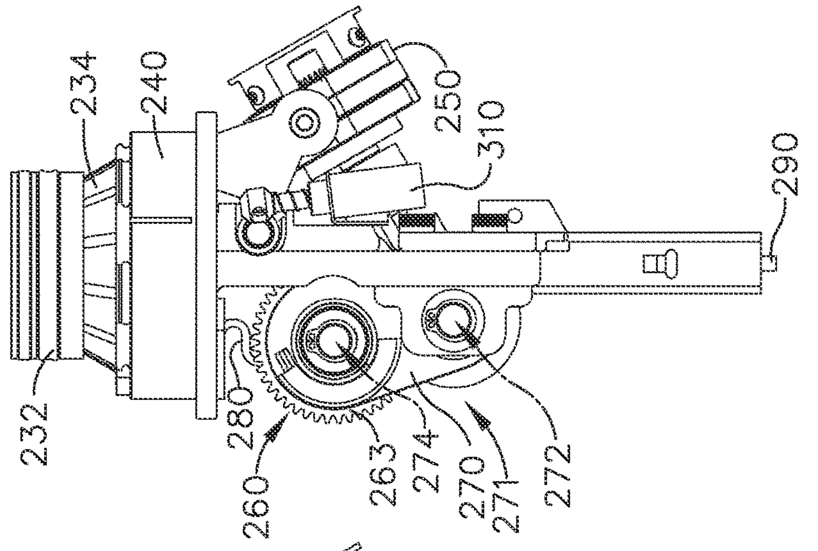
FIG. 21 is a side view of the tool of FIG. 19, taken along the line 21-21.
Figure 19:
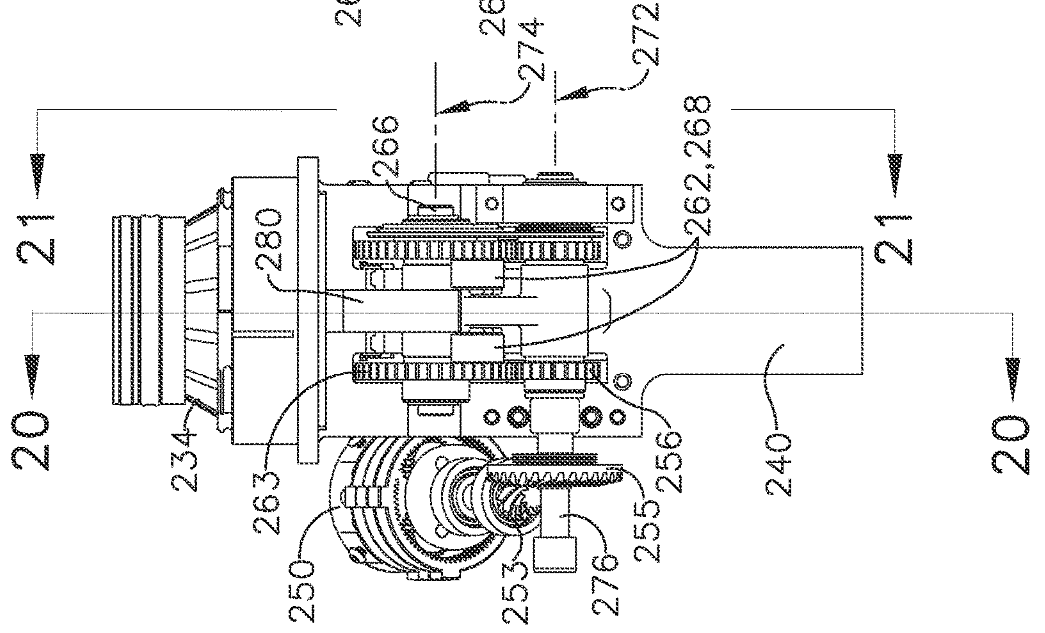
FIG. 19 is a front elevational view of the tool of FIG. 15, with the lifter subassembly in its open position.

FIGS. 19-21 are all views of the drive assembly in its open or non-engaged position. FIG. 20 is a cross-section view taken along the line 20-20 as seen on FIG. 19, and FIG. 21 is a side view taken along the line 21-21 as seen on FIG. 19. As can be easily seen in FIGS. 20 and 21, the lifter subassembly 260 has been rotated a small angular distance in the counterclockwise direction (as seen in these views). Therefore, the lifter pins 262 are out of position from engaging with the driver 290. In the view of FIG. 21, the piston 232 is in its driven position, and it is seated against the top of the piston stop 234.

The rotation of the pivot arm 270 will occur in this illustrated alternative if one of the lifter pins 262 is forced "too hard" against the driver member 290. The pivot arm subassembly 271 is designed with a mechanical geometry such that the rotational dynamic forces will tend to keep the lifter subassembly 260 engaged within its nested position with respect to the guide body 240. However, there is a degree of freedom available—because of the pivot arm subassembly 271—that allows the lifter subassembly 260 to "float" along the side of the driver member 290. This ability to typically float along with the driver member also allows the lifter subassembly 260 to "release" from engagement with the driver member 290, when necessary. The act of "releasing" is what the pivot arm subassembly 271 does when a lifter pin 262 would otherwise jam against the driver member 290 (or one of its teeth 292), or the lifter subassembly 260 is unable to move the driver member 290, and therefore, would try to "slip" along the face of the driver 290, instead of locking and jamming. This releasing action occurs when the pivot arm 270 actually pivots (i.e., rotates) about its pivot axis 272.

Another feature readily visible on FIGS. 15 and 16 is a pivot arm spring 280. In FIG. 15, the distal (bottom, in this view) portion of pivot arm spring 280 approximates a straight line, which is its normal profile when the lifter subassembly is in its engagement position. However, the pivot arm spring 280 is flexible, and as seen in FIG. 16, it can be bent outward when the lifter subassembly 260 is forced to its open (disengaged) position. The pivot arm spring 280 exerts a force against the lifter subassembly 260 to ensure that it will stay within its engagement position such that it will not "pop out" from that engagement position during a lifting (return) stroke, unless a jam might otherwise occur. The rotational dynamic forces will tend to keep the lifter subassembly 260 within its engagement position; however, if the pivot arm subassembly 271 is forced to "rotate out" for any reason (such as for reasons discussed above), then the pre-load spring acts to ensure that the pivot arm subassembly 271 then "rotates back in" to its normal, closed (or engaged) position.

Figure 25:
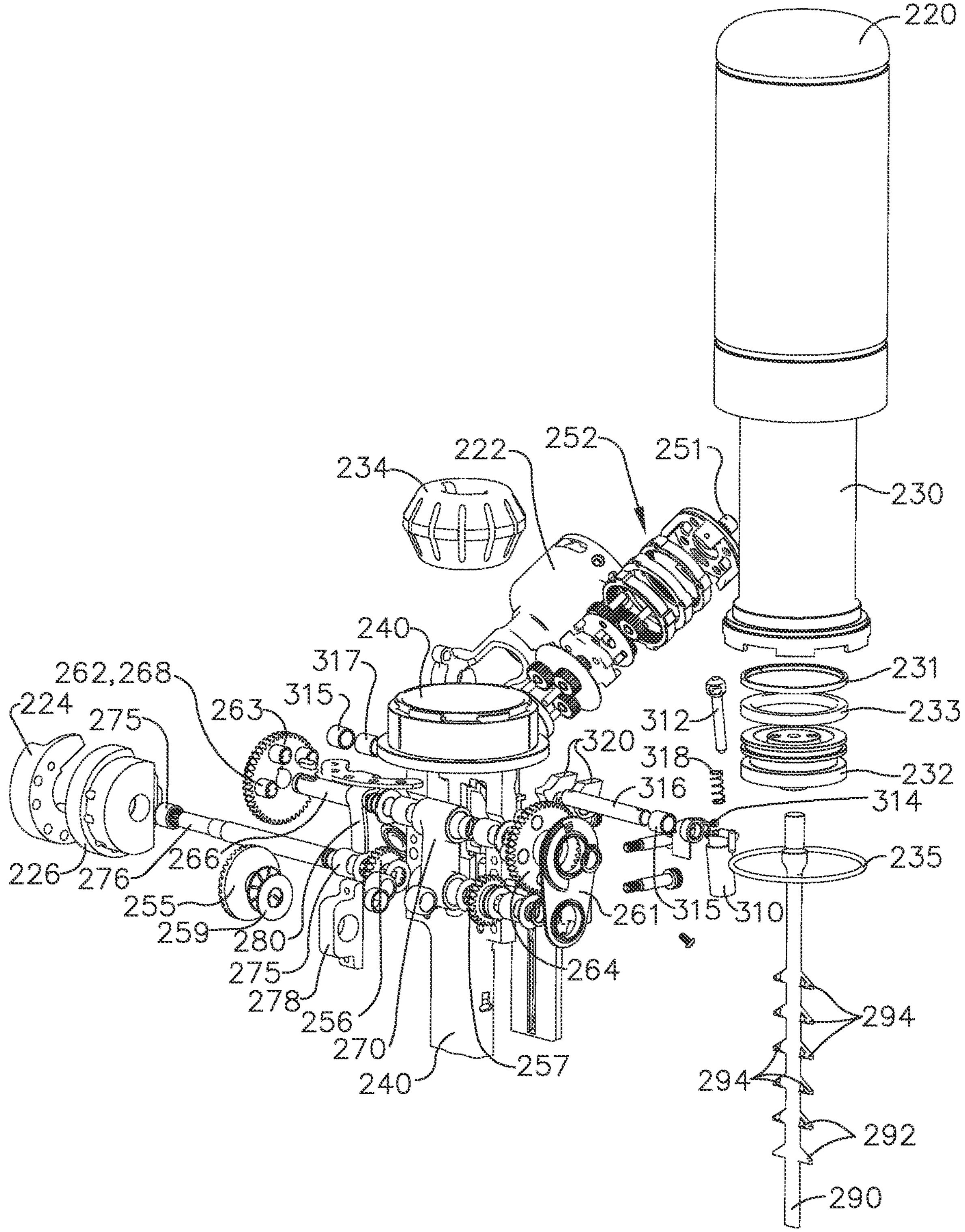
FIG. 25 is an exploded view of the tool of FIG. 15.

Referring now to FIG. 25, the driver assembly for the nailer tool is depicted in an exploded view that shows most of the component parts as individual items. Of particular note in this view is the driver member 290 with its multiple protrusions 292, including protrusions having the raised area 294. Also of note are the various components of the lifter subassembly, including the lifter gears 263 and 264, the multiple lifter pins 262 with their rollers 268, and the lifter shaft 266. The lifter shaft 266 is mounted at the second end of the pivot arm 270, which is visible on FIG. 25.

The pivot arm spring 280 and the latch solenoid 310 also are illustrated on FIG. 25. Latch solenoid 310 has a plunger 312 that connects to the latch push arm 314, then the latch shaft 316. The latch shaft 316 is supported on both ends by latch bushings 315, and also be a mid-shaft bushing 317.

Further details of the pivot arm subassembly 271 are seen on FIG. 25. The ends of the pivot shaft 276 are supported by roller bearings 275, which are contained within bearing housings 278 and 226. The driving gears of pivot arm subassembly 271 are contained within a pair of housing halves 224 and 226. The bevel gear 255 has an associated thrust bearing and thrust washer 259. A mounting plate subassembly 261 rides the end portions of pivot shaft 276 and lifter shaft 266, and holds a Hall-effect transducer or similar position sensor in place.

The main gearbox 252 has many internal mechanical components, which can be seen in FIG. 25. A pinion gear 251 is visible, which receives the output rotational motion from the motor 250 (not seen on FIG. 25), and transmits that motion to the gearbox 252. The gearbox housing 222 is also depicted on FIG. 25.

Further details of the main drive cylinder and piston are seen on FIG. 25. The outer surface of the cylinder 230 is visible, which includes several internal components when assembled. The main piston 232 has a bearing ring 231 and an O-ring 233 on its "upper" portion (in this view). Another O-ring 235 seals the pressure chamber to the cylinder. The lower portion of the piston connects to the driver 290, when assembled.

The piston stop 234 is visible on FIG. 25, although it is not shown as being in-line with the main piston drive train. Instead, it is positioned just above the guide body 240, which is correct. It will be understood that the driver 290 and the piston 232 have centerlines that line up with the piston stop 234, and that the driver glides along the guide body 240 when moving between its ready and driven positions.

There are, of course, many fasteners and other parts depicted in this exploded view that have not been described in detail herein.

It will be understood that the driver member 290 could be driven toward the exit end by a type of driver actuation device other than a gas spring. For example, the piston 232 could have a top circular area that is forced downward (in the view of FIG. 18) by a mechanical spring, which could be a fast-acting coil spring, for example, thereby also causing driver member 290 to quickly move downward (in this view). Or an alternative driver actuation device could use a different type of mechanical force, for example, applied by compressed foam. In such alternative embodiments, there would be no need for a cylinder at all, and instead the coil spring (or other device) would merely need a mechanical guide to keep it moving in a correct motion.

It will also be understood that the driver members 90 or 290 could be typically stopped at a "holding" position that is either at (or proximal to) a first end travel location or a second end travel location (e.g., at the top or bottom) of the driver member's travel. In other words, if the holding position is at the top (as illustrated in FIGS. 22-24, for example), then a lifting stroke must occur before the holding position (which becomes the "ready" position) is reached by the driver member; but then, the piston is quite ready to be displaced quickly to drive a fastener, upon actuation of the trigger by a user of the tool. However, if the holding position is at the bottom of the driver member's travel, then the lifting stroke must occur after the trigger is actuated by a user of the tool; therefore, this second example of tool operation is less desirable from a "speed" of operation standpoint because, after the trigger is actuated, the lifting stroke must still occur before the fastener is driven. In either mode of operation (i.e., with the holding position at the top or at the bottom, or at an intermediate travel position for that matter), the superior characteristics of the technology disclosed herein—to allow the movable (pivot) arm to displace away from the driver member, for example, to prevent jams—are fully taken advantage of.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

Other aspects of the present technology may have been present in earlier fastener driving tools sold by the Assignee, Senco Products, Inc., including information disclosed in previous U.S. patents and published applications. Examples of such publications are U.S. Pat. Nos. 6,431,425; 5,927,585; 5,918,788; 5,732,870; 4,986,164; and 4,679,719; also U.S. Pat. Nos. 8,011,547, 8,267,296, 8,267,297, 8,011,441, 8,387,718, 8,286,722, 8,230,941, and 8,763,874.

All documents cited in the Background and in the Detailed Description are, in relevant part, incorporated herein by reference, including those cited in the paragraph above. The citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A lifting machine for use in a fastener driving tool, said lifting machine comprising:

(a) a movable piston;

(b) a guide body that includes a driver track;

(c) an elongated driver that is in mechanical communication with said movable piston at a first end of said driver, said driver having a second, opposite end that is sized and shaped to push a fastener, said driver having a direction of movement along the driver track that is substantially along a longitudinal axis that extends at least between the first end and the second end, said driver including a first face that extends along a length direction parallel to the longitudinal axis at least partially between the first end and the second end, a second face that extends along a length direction parallel to the longitudinal axis at least partially between the first end and the second end, a third face that extends along a length direction parallel to the longitudinal axis at least partially between the first end and the second end, and a fourth face that extends along a length direction parallel to the longitudinal axis at least partially between the first end and the second end, said first face having a first common edge with said second face, said second face having a second common edge with said third face, said third face having a third common edge with said fourth face, and said fourth face having a fourth common edge with said first face, said first face being substantially wider than said second face, said first face being substantially wider than said fourth face, and said first face being about the same width as said third face, in which the outer surfaces of said first, second, third, and fourth faces substantially create an overall rectangular shape in cross-section, with said first and third faces being on opposite sides of the driver from one another, and with the second and fourth faces being on opposite sides of the driver from one another;

(i) a first plurality of spaced-apart protrusions that extend from said second face in a direction that is substantially parallel to the first face; and (ii) a second plurality of spaced-apart protrusions that extend from said fourth face in a direction that is substantially parallel to the first face;

(d) a rotatable lifter subassembly comprising a first rotatable disk and a second rotatable disk, said first and second rotatable disks rotate together, said first rotatable disk having a first plurality of spaced-apart lifter pins extending from a surface of the first rotatable disk, and said second rotatable disk having a second plurality of spaced-apart lifter pins extending from a surface of the second rotatable disk;

(e) wherein, during a lifting stroke that lifts said driver toward the movable piston:

(i) said first and second rotatable disks both rotate in a first direction; and (ii) a rotational movement of both said first plurality of lifter pins and said second plurality of lifter pins engage, respectively, with said first plurality of spaced-apart protrusions of the driver and with said second plurality of spaced-apart protrusions of the driver.

2. The lifting machine of claim 1, wherein said first plurality of spaced-apart protrusions extends in a first direction that is substantially co-planar with the first face of the driver, and said second plurality of spaced-apart protrusions extends in a second direction that also is substantially co-planar with the first face of the driver.

3. The lifting machine of claim 1, wherein, as said rotational movement of said first plurality of lifter pins and said second plurality of lifter pins engage respectively with said first plurality of spaced-apart protrusions and said second plurality of spaced-apart protrusions, the rotational motion of the first and second rotatable disks causes a linear motion of the driver.

4. The lifting machine of claim 3, wherein said rotational movement of said first plurality of lifter pins and said second plurality of lifter pins simultaneously engage against a surface of at least one each of said first and second plurality of spaced apart protrusions on opposite sides of said driver, thereby substantially balancing mechanical lifting forces on both sides of the driver during said lifting stroke.

5. A lifting machine for use in a fastener driving tool, said lifting machine comprising:

(a) a movable piston;

(b) a guide body that includes a driver track;

(c) an elongated driver that is in mechanical communication with said movable piston at a first end of said driver, said driver having a second, opposite end that is sized and shaped to push a fastener, said driver having a direction of movement along the driver track that is substantially along a longitudinal axis that extends at least between the first end and the second end, said driver including at least a first face, a second face, and a third face, said first, second, and third faces each extending along a length direction parallel to the longitudinal axis at least partially between the first end and the second end of the driver, said first face having a first common edge with said second face, and said third face having a second common edge with said first face, said first face being substantially wider than said second face, and said first face being substantially wider than said third face, with the second and third faces being on opposite sides of the driver from one another;

(i) a first plurality of spaced-apart protrusions that extend from said second face in a direction that is substantially parallel to the first face; and (ii) a second plurality of spaced-apart protrusions that extend from said third face in a direction that is substantially parallel to the first face; and (d) a rotatable lifter subassembly comprising a first rotatable disk and a second rotatable disk, said first and second rotatable disks rotate together, said first rotatable disk having a first plurality of spaced-apart lifter pins extending from a first surface of the first rotatable disk, and said second rotatable disk having a second plurality of spaced-apart lifter pins extending from a second surface of the second rotatable disk, wherein:

(i) said first surface of the first rotatable disk forms a first plane that is substantially perpendicular to said first face of the driver; and (ii) said second surface of the second rotatable disk forms a second plane that is substantially perpendicular to said first face of the driver;

(e) wherein, during a lifting stroke that lifts said driver toward the movable piston:

(i) said first and second rotatable disks both rotate in a first direction; and (ii) a rotational movement of both said first plurality of lifter pins and said second plurality of lifter pins engage, respectively, with said first plurality of spaced-apart protrusions of the driver and with said second plurality of spaced-apart protrusions of the driver.

6. The lifting machine of claim 5, wherein said first plurality of spaced-apart protrusions extends in a first direction that is substantially co-planar with the first face of the driver, and said second plurality of spaced-apart protrusions extends in a second direction that also is substantially co-planar with the first face of the driver.

7. The lifting machine of claim 5, wherein:

a third plane formed by said first face of the driver intersects with the first plane of the first rotatable disk at a first position that is proximal to the first common edge of the driver; and the third plane formed by said first face of the driver intersects with the second plane of the second rotatable disk at a second position that is proximal to the second common edge of the driver.

8. The lifting machine of claim 5, wherein, as said rotational movement of said first plurality of lifter pins and said second plurality of lifter pins engage respectively with said first plurality of spaced-apart protrusions and said second plurality of spaced-apart protrusions, the rotational motion of the first and second rotatable disks causes a linear motion of the driver.

9. The lifting machine of claim 8, wherein said rotational movement of said first plurality of lifter pins and said second plurality of lifter pins simultaneously engage against a surface of at least one each of said first and second plurality of spaced apart protrusions on opposite sides of said driver, thereby substantially balancing mechanical lifting forces on both sides of the driver during said lifting stroke.

10. A lifting machine for use in a fastener driving tool, said lifting machine comprising:

(a) a movable piston;

(b) a guide body that includes a driver track;

(c) an elongated driver that is in mechanical communication with said movable piston at a first end of said driver, said driver having a second, opposite end that is sized and shaped to push a fastener, said driver having a direction of movement along the driver track that is substantially along a longitudinal axis that extends at least between the first end and the second end, said driver including at least a first face, a second face, and a third face, said first, second, and third faces each extending along a length direction parallel to the longitudinal axis at least partially between the first end and the second end of the driver, said first face having a first common edge with said second face, and said third face having a second common edge with said first face, said first face being substantially wider than said second face, and said first face being substantially wider than said third face, with the second and third faces being on opposite sides of the driver from one another;

(i) a first plurality of spaced-apart protrusions that extend from said second face in a direction that is substantially parallel to the first face; and (ii) a second plurality of spaced-apart protrusions that extend from said third face in a direction that is substantially parallel to the first face; and (d) a rotatable lifter subassembly comprising a first rotatable disk and a second rotatable disk, said first and second rotatable disks rotate together, said first rotatable disk having a first plurality of spaced-apart lifter pins extending from a first surface of the first rotatable disk, and said second rotatable disk having a second plurality of spaced-apart lifter pins extending from a second surface of the second rotatable disk, wherein:

(i) a rotational motion of the first rotatable disk occurs within a first plane that is substantially perpendicular to said first face of the driver; and (ii) a rotational motion of the second rotatable disk occurs within a second plane that is substantially perpendicular to said first face of the driver;

(e) wherein, during a lifting stroke that lifts said driver toward the movable piston:

(i) said first and second rotatable disks both rotate in a first direction; and (ii) a rotational movement of both said first plurality of lifter pins and said second plurality of lifter pins engage, respectively, with said first plurality of spaced-apart protrusions of the driver and with said second plurality of spaced-apart protrusions of the driver.

11. The lifting machine of claim 10, wherein said first plurality of spaced-apart protrusions extends in a first direction that is substantially co-planar with the first face of the driver, and said second plurality of spaced-apart protrusions extends in a second direction that also is substantially co-planar with the first face of the driver.

12. The lifting machine of claim 10, wherein:

a third plane formed by said first face of the driver intersects with the first plane of the first rotatable disk at a position that is proximal to the first common edge of the driver; and the third plane formed by said first face of the driver intersects with the second plane of the second rotatable disk at a position that is proximal to the second common edge of the driver.

13. The lifting machine of claim 10, wherein, as said rotational movement of said first plurality of lifter pins and said second plurality of lifter pins engage respectively with said first plurality of spaced-apart protrusions and said second plurality of spaced-apart protrusions, the rotational motion of the first and second rotatable disks causes a linear motion of the driver.

14. The lifting machine of claim 13, wherein said rotational movement of said first plurality of lifter pins and said second plurality of lifter pins simultaneously engage against a surface of at least one each of said first and second plurality of spaced apart protrusions on opposite sides of said driver, thereby substantially balancing mechanical lifting forces on both sides of the driver during said lifting stroke.

* * * * *